United States Patent [19]

Omura et al.

[11] 3,886,419

[45] May 27, 1975

[54] ELECTRICAL REFRIGERATING COMPRESSOR

[75] Inventors: Morikazu Omura; Masao Okuda, both of Tokyo, Japan

[73] Assignee: Sawafuji Electric Company, Ltd., Japan

[22] Filed: Apr. 10, 1974

[21] Appl. No.: 459,652

[30] Foreign Application Priority Data
Apr. 14, 1973    Japan.............................. 48-42429
Mar. 20, 1974    Japan.............................. 49-31752

[52] U.S. Cl. .................. 318/132; 310/15; 318/129; 331/116 M
[51] Int. Cl. ......................................... H02k 33/00
[58] Field of Search ........... 318/132, 119, 127, 128, 318/129, 133; 310/15; 331/116 M, 154; 321/44, 45 R

[56] References Cited
UNITED STATES PATENTS
3,056,910   10/1962   Hajian.............................. 318/132 X
3,515,966   6/1970    DeValroger et al. ............ 318/132 X
3,729,691   4/1973    Beiswinger et al.................. 318/132

Primary Examiner—R. N. Envall, Jr.
Attorney, Agent, or Firm—Connolly and Hutz

[57] ABSTRACT

A refrigerating compressor of the electrical vibration type operated at a constant vibration cycle of resonance tuned between its mechanical and electrical vibration systems by controlling the natural vibration cycles of the two vibration systems to be automatically coincident with each other in reference to the vibration waveform of the load current due to using the unsaturated core type control transformer and the semiconductor switching elements.

27 Claims, 37 Drawing Figures

F I G. 8(a)
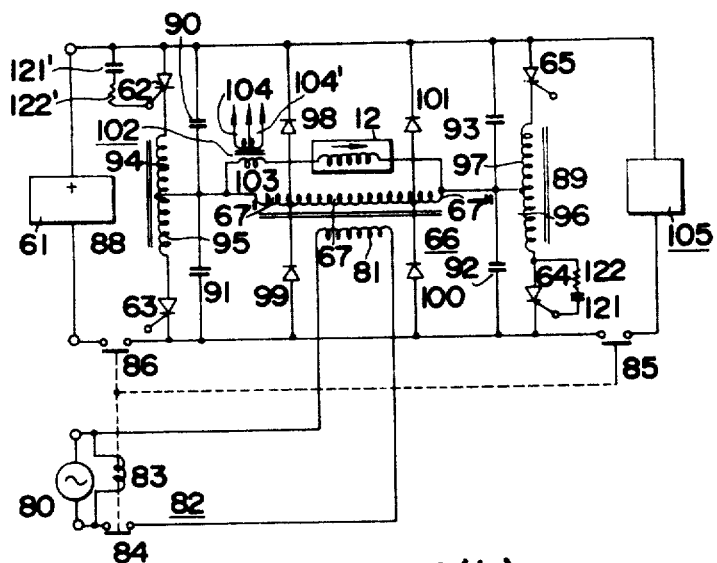
F I G. 8(b)
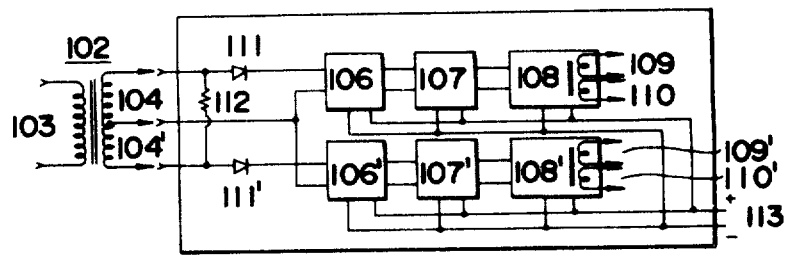
F I G. 8(d)
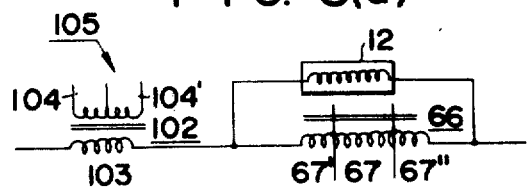
F I G. 10
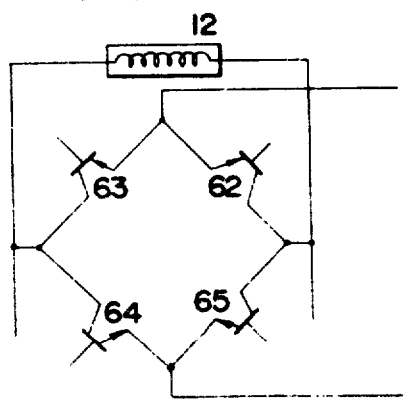

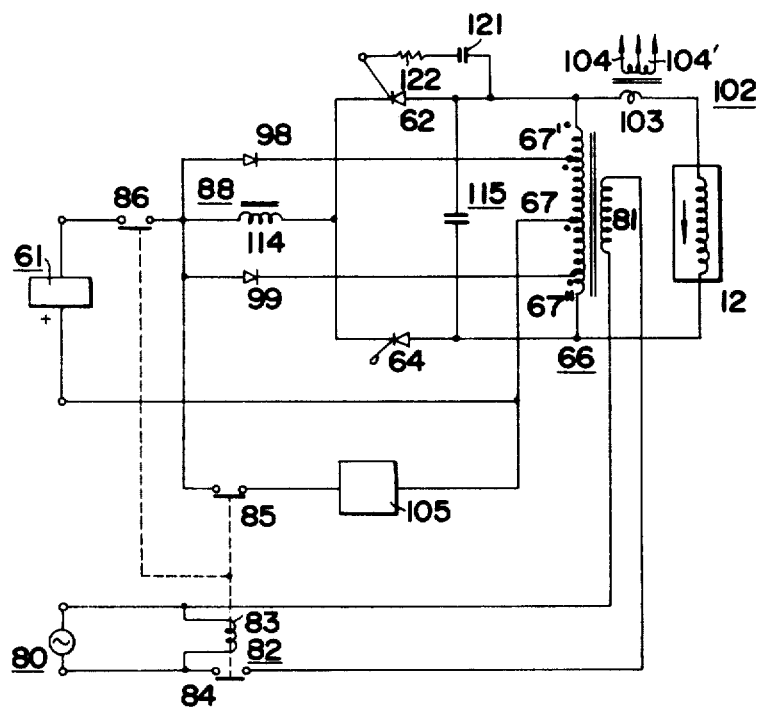
F I G. 9(a)
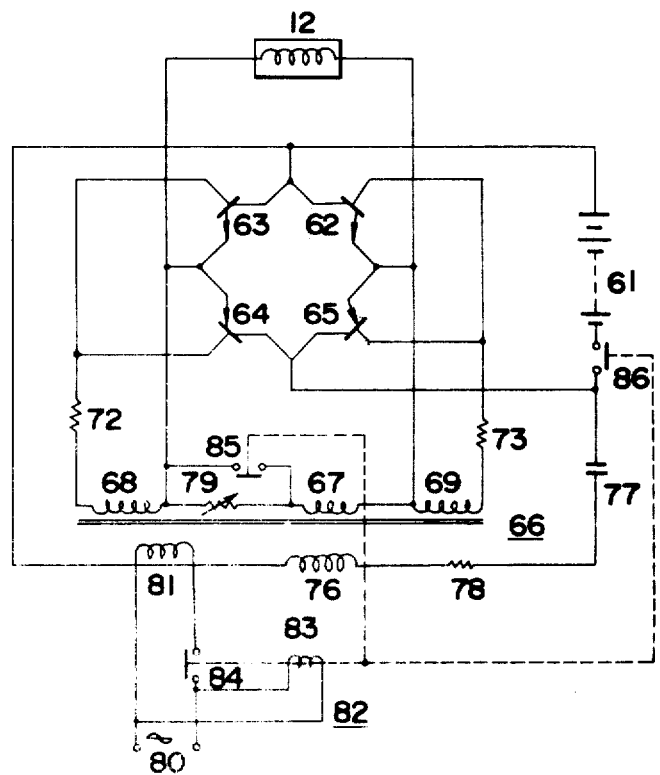
F I G. 15

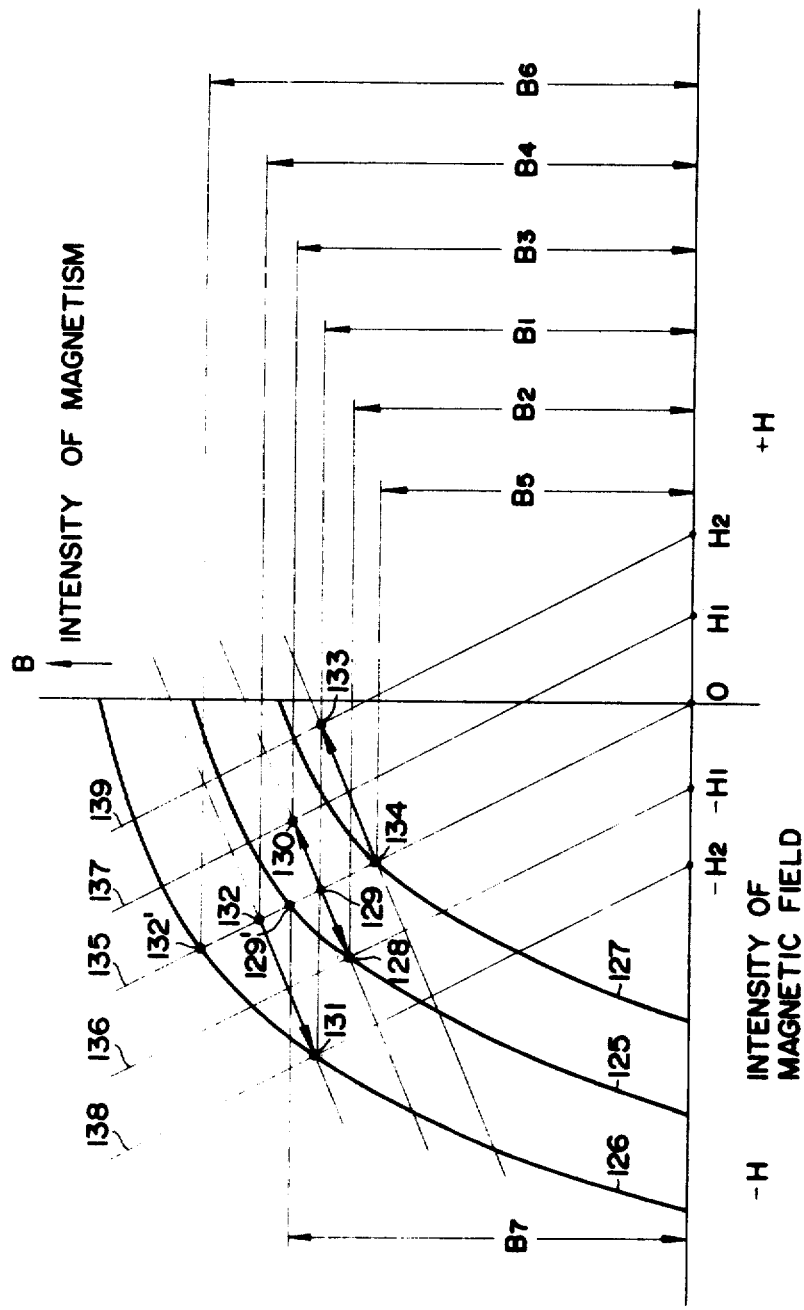

F I G. 14(a)
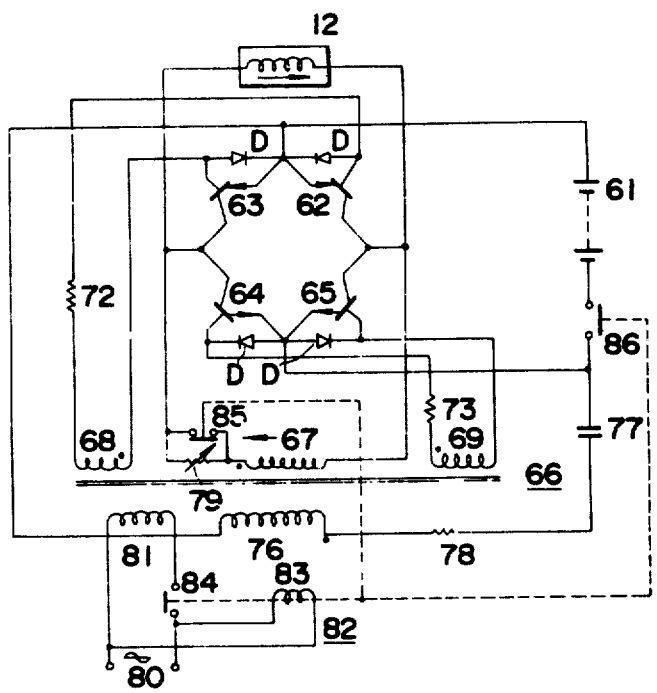
F I G. 14(b)
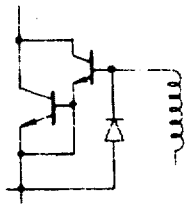
F I G. 14(c)
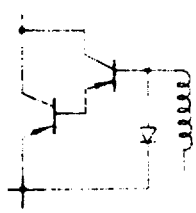
F I G. 14(d)
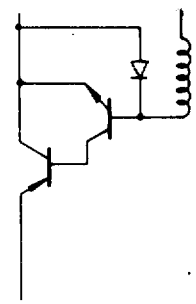
F I G. 14(e)
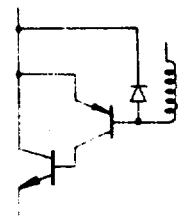

ELECTRICAL REFRIGERATING COMPRESSOR

FIELD OF THE INVENTION

The present invention relates to refrigerating compressors of the electrical vibration type primarily driven by a DC power source. Such compressors are suited for use in refrigerators installed on camping coaches, boats, and the like.

The invention relates more specifically in refrigerating compressors of the electrical vibration type operable with maximum efficiency through the function in which the mechanical and electrical vibration systems constituted of integrally combined mechanical and electrical components are controlled so that the natural vibration cycles of the two vibration systems are more automatically coincident with each other.

BACKGROUND OF THE INVENTION

Generally, electrical refrigerators of the type associating electrical vibration type compressors and installed on camping coaches, boats, and the like, are required to be driven from a battery of small capacity. This has necessitated the use of an electrical device which converts DC current to AC current for the compressor. To save battery power, the refrigerator should also be operable from AC power sources usually available, for example, in camping areas and boat harbors. Besides, this type of refrigerator should be compact in construction and light in weight for easy transportation.

To meet these requirements the following guidelines are applicable.

1. The compressor should have a sufficiently high operable efficiency to minimize the consumption of battery power.
2. The compressor, including its drive mechanism, should be small in size and light in weight.
3. The compressor should be able to operate from an AC power source as well as from a DC power source.

One prior art compressor of the electrical vibration type utilizes the phenomenon of resonance tuned between the mechanical and electrical vibration cycles. This type of compressor, however, can be operated only through utilization of resonance phenomenon and by the supply of AC power. In this connection, problems have been encountered in the prior art. For example, the power source frequency fluctuates, the refrigerant gas pressure is different at the suction and discharge ports due to variations in ambient temperature, and the natural vibration cycle of the mechanical vibration system is variable due to mechanical arrangements reasons such as the linkage used with the resonant spring or due to mechanical characteristic discrepancies caused in the production process. These drawbacks hamper the achievement of higher compression efficiency and operating stability.

In order to supply the compressor with AC power provided from a battery, an inverter of the semiconductor type has been used. Generally, however, this kind of inverter is incapable of producing constantly regular waveforms. If the compressor is designed independent of its power source (i.e., the inverter), several of the problems mentioned above are combined to worsen the problem of vibratory discoincidence which considerably lowers the compression efficiency. One solution to this problem is to increase the compression capacity and the drive power. This, however, gives rise to another problem — the compressor is inevitably heavier in weight. In order to avoid the problem, the compressor must have extremely high operating efficiency.

In the compressor, the relationship among the quantity of the refrigerant gas discharged, the power input, and the vibration cycle is as follows. The maximum compression efficiency is obtained at a point between the maximum point of gas discharge volume and the minimum input power. At this maximum compression efficiency, the electrical power factor in the compressor is nearly unity and the vibration strokes is maximum. At this vibration cycle, the electrical and mechanical vibration systems can reach a resonance. In the practical compressor of the electrical vibration type, the vibration cycle for the maximum compression efficiency is variable by the foregoing reasons. To maintain the maximum compression efficiency, therefore, it is necessary to cause the vibration cycle of the drive power to follow the vibration cycle at which the maximum compression efficiency is obtainable.

SUMMARY OF THE INVENTION

A general object of the invention is to provide a highly efficient compressor integrally associating a drive mechanism, the compressor being suitable for use in refrigerators installed on vehicles, coaches, boats, and the like.

Another object of the invention is to provide an electrical vibration type compressor in which its mechanical and electrical components, and including a DC-to-AC converting device which provides AC power to drive the compressor, are controlled so that the natural vibration cycles of the mechanical and electrical vibration systems are made automatically coincident with each other with reference to the vibration waveform of the load current.

Still another object of the invention is to provide an electrical vibration type compressor in which, in order to establish coincidence between the mechanical and electrical vibration cycles, the electrical vibration system is always operated at the natural vibration cycle of the mechanical vibration system according to the movement of the mechanical vibration system, and the necessary power is supplied to the mechanical vibration system.

Another object of the invention is to provide an electrical machine comprising an electrical vibration type compressor composed essentially of semiconductor switching element switchably controlled according to the variable factors of the electrical vibration system in relation to the movement of the drive coil, and a control transformer of unsaturated core type.

These and other objects of the invention are achieved by suitably combining electrical and mechanical components.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 6, 7(a), 7(b), 8(a), 8(b), 8(d), 9(a), 9(b), 10, 11, 12 and 15 are electrical schematic illustrating certain embodiments of the present invention;

FIGS. 13(a)-(f), 14(a) through 14(e), 16(a) and 16(b) are circuit diagrams illustrating embodiments of the invention.

DETAILED DESCRIPTION OF THE INVENTION

Figure 3:
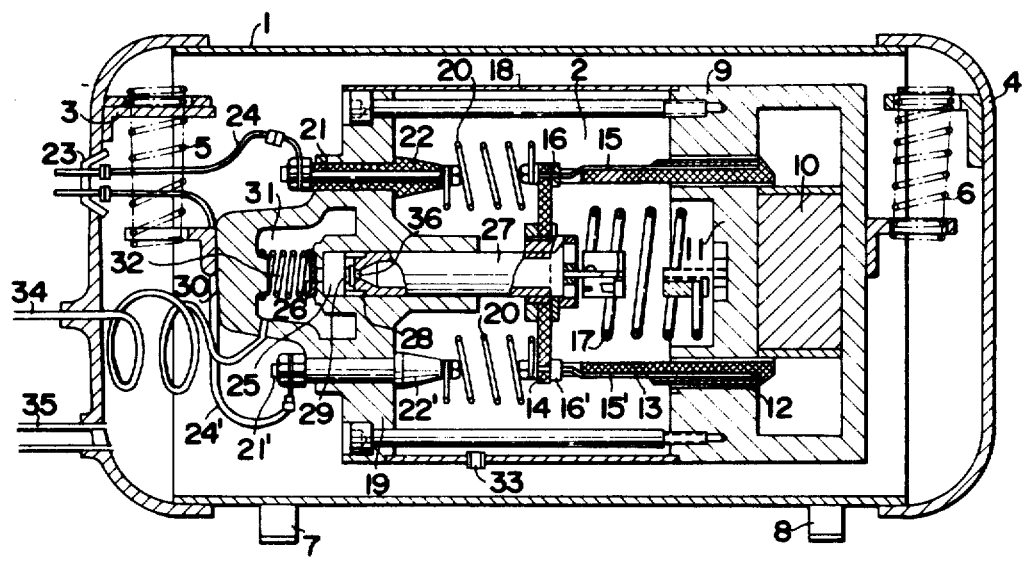
FIG. 3 is a longitudinal sectional view showing the mechanical arrangement of an electrical vibration type compressor operated under automatic control, according to the present invention.

Referring in more particularity to the drawing. FIG. 3 shows a sectional view of the mechanical part of an electrical vibration type compressor, according to the invention. In FIG. 3, a closed or hermetic cylindrical casing 1 is provided in which a compressor unit 2 is suspended from brackets 3 and 4 through coil springs 5 and 6. The casing 1 is equipped with mounting feet 7 and 8. The compressor unit 2 comprises a cylindrical yoke 9, a cylindrical permanent magnet 10 connected to the yoke 9 in the center thereof, a cup-shaped magnetic pole 11 fitted to the permanent magnet 10 on the side opposite the bottom of the yoke 9, a cylindrical drive coil 12 loosely mounted in the annular space formed between the outer surfaces of the magnetic pole 11 and the inner wall of the yoke 9, a disk-shaped support plate 14 supporting the coil 12 by way of a plurality of support members 13, lead plates 15 and 15' serving as electric conductors connected to the drive coil 12, insulators 16 and 16' used for electrically insulating the support plate 14 from the lead plates 15 and 15', a resonance coil spring 17 disposed in the space between the magnetic pole 11 and the support plate 14, a cylindrical case 18 concentric with the yoke 9, a cylinder 19 installed at the end of the case 18 opposite the yoke 9, lead springs 20 and 20', terminal screws 21 and 21', insulators 22 and 22' insulating the terminal screws 21 and 21' from the cylinder 19, lead wires 24 and 24' connecting the terminal screws 21 and 21' to the terminal 23 of the outer casing, a valve cavity 25 in the cylinder 19, a valve plate 26, a valve cavity 28 in the piston 27, a valve plate 29, a cup-shaped head cover 30 covering the valve cavity 25, and a coil spring 32 compressively mounted in the opening 31 between the valve plate 26 and the head cover 30.

A refrigerant passage 33 provides communication between the interior and the exterior of the case 18 and is disposed in the lower part of the case 18, as shown in FIG. 3. A refrigerant outlet tube 34 is connected at the head cover 30 to allow the opening 31 inside the head cover 30 to communicate with the interior of the compressor unit 2. The exterior of the outer casing 1 communicates with the exterior of the compressor unit 2 through a refrigerant inlet tube 35.

A hollow piston 27 has a hole 36 at its left end (as seen in FIG. 3) through which the interior of the piston communicates with the valve cavity via the valve 29.

The piston 27 vibrates as the drive coil 12 vibrates in a manner as described more fully below. With the piston 27 vibrating, the refrigerant enters the outer casing 1 by way of the inlet tube 35 and flows into the case 18 through the passage 33. The refrigerant goes through the piston 27, valve cavities 28, 25 and 31 and comes out of the outlet tube 34.

The mechanical vibration system consists essentially of the drive coil 12, piston 27, members connecting them, and coil spring 17. This vibration system has a natural vibration cycle dependent on the structure of the mechanical vibration system. According to the invention, the mechanical natural vibration cycle resonates with the current of drive power as will be described later.

Ideally, the members which constitute the mechanical vibration system should be uniform in quality. However, since it is impossible to obtain such ideal members, the natural vibration cycle of the mechanical vibration system is irregular or variable by the individual compressors manufactured. The larger the mechanical vibration cycle varies, the greater will be the deviation between the mechanical vibration cycle and the drive current vibration cycle. This has hampered the achievement of higher compression efficiency. To solve this problem, in the prior art, the quality and precision of the mechanical component parts used have been improved, which, on the other hand, has lowered the productivity.

Furthermore, the natural vibration cycle of the mechanical vibration system varies also by the condition where the compressor is operated, with the result that the mechanical natural vibration cycle deviates from the drive current vibration cycle.

Figure 1:
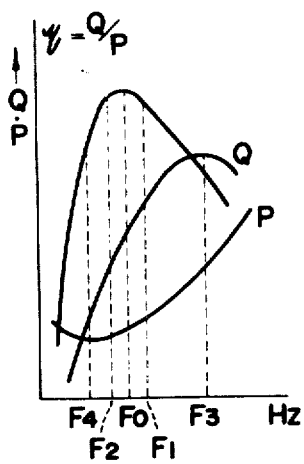
FIG. 1 is a diagram showing characteristics of an electrical vibration type compressor operated at a given natural vibration cycle in relation to input, output and compression efficiency.

FIG. 1 is a graphic illustration showing the relationship between the maximum frequency for the discharge volume Q of the refrigerant gas and the minimum frequency for the input power P, leading to the efficiency, $\mu = QP$, in a vibration type compressor, provided that the input voltage, the refrigerant gas discharge pressure and the suction pressure are constant.

Referring to FIG. 1, the maximum frequency $F_3$ for the discharge volume Q is higher than the maximum stroke frequency of the piston 27, and the minimum frequency $F_4$ for the input power P is lower than the frequency $F_3$ by two to three hertz. Accordingly, the frequency at which the compressor can operate with its maximum efficiency $\mu$ lies at $F_0$ between $F_3$ and $F_4$.

A practical vibration type compressor adapted to a commercial AC power source is driven not always at the maximum frequency $F_0$ but at a frequency between $F_3$ and $F_4$, that is $F_1$ or $F_2$, because of variations in the resonant frequency by the discharge pressure Pd and suction pressure Ps, as well as variations in the quality of component parts used.

Figure 5:
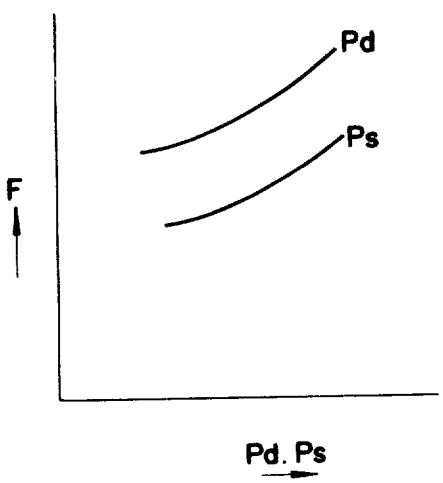
FIG. 5 is a diagram showing natural vibration characteristics of the mechanical vibration system in relation to the pressures of refrigerant gas at the discharge and suction ports.
Figure 2:
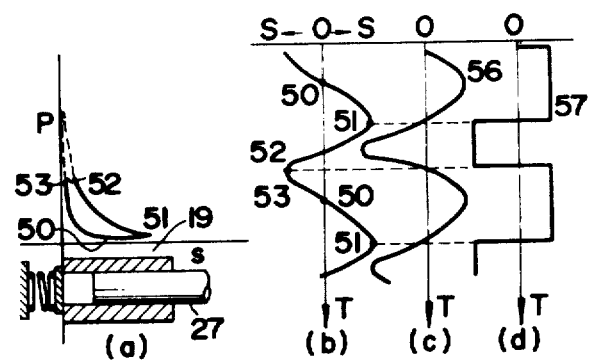
FIG. 2 is a diagram showing the correlation in the characteristics of an electrical vibration type compressor with respect to input voltage, counter-electromotive force, and waveform amplitude.

Still further, as will be described below by referring to FIG. 2, the displacement and the displacing time (i.e., cycle) will differ on both sides of the mechanical vibration system centering the neutral point of the vibration. This is because the refrigerant discharge pressure Pd differs from the refrigerant suction pressure Ps, and the spring constants on the both sides differ from each other. FIG. 5 shows how the mechanical natural vibration cycle F varies with the displacement of the pressures Pd and Ps.

In FIG. 2(a), when the piston 27 reaches its extreme position 51 from the neutral point 50 in the suction stroke and makes its compression stroke, the S–P characteristic curve assumes a loop 50–51–52–53–50. As a result, the vibration curve of the mechanical vibration system swings asymmetrically as shown in FIG. 2(b). This indicates that both the displacement and the cycle are smaller in the compression stroke than in the suction stroke.

It is evident that the efficiency of the compressor is lowered if the asymmetrically vibrating system is driven by symmetrical current. Ideally, to obtain the maximum operating efficiency, the mechanical vibration system should be driven by a current of waveform 56 as in FIG. 2(c) which is similar to that shown in FIG. 2(b). Instead of the waveform 56, a square waveform 57 may be used to make the two vibration phases coincident.

Figure 4:
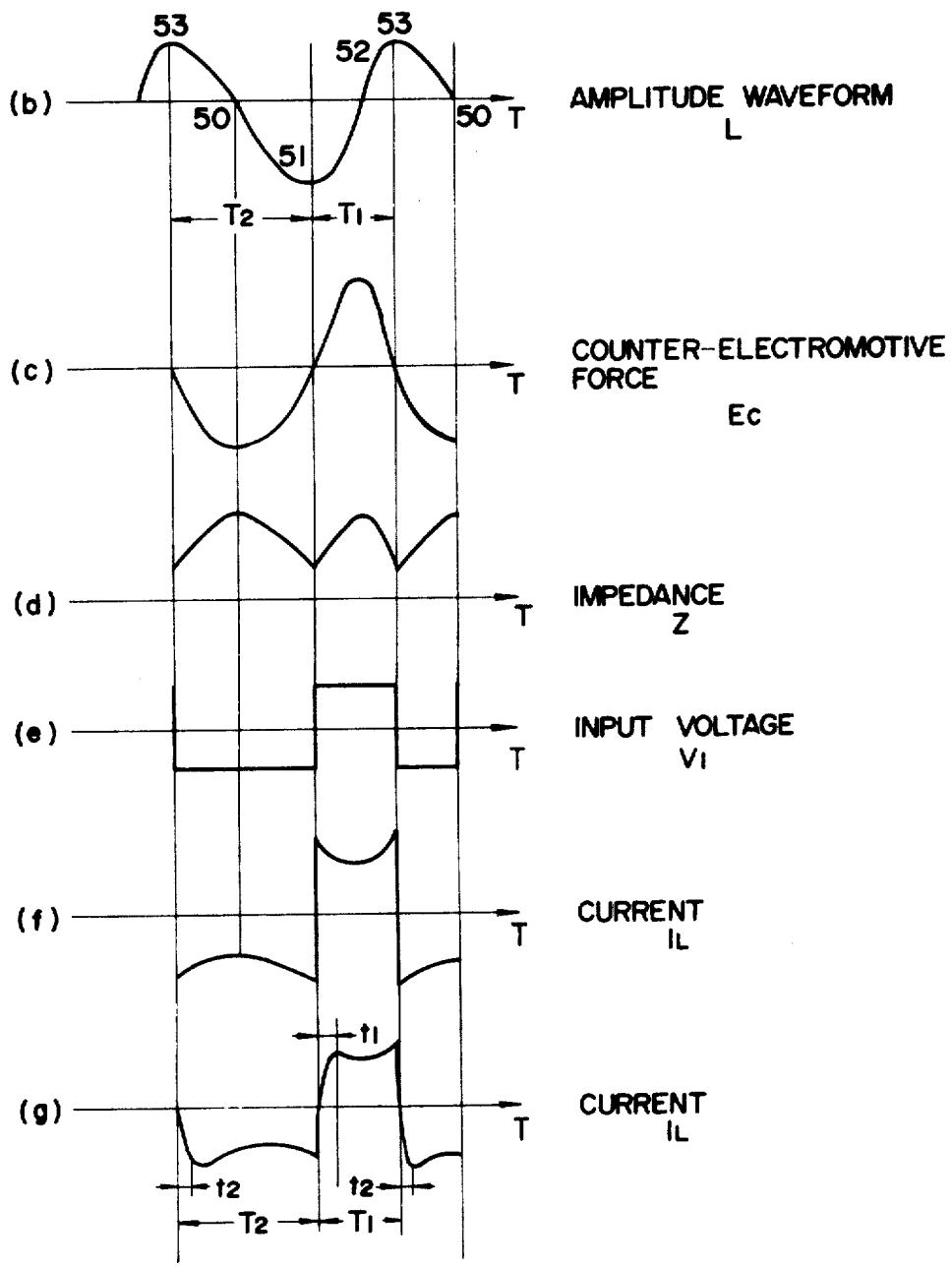
FIG. 4(b) through 4(g) are diagrams showing the vibratory state of the electrical vibration system of the compressor of the present invention.

A counter-electromotive force Ec as in FIG. 4(c) is produced across the drive coil 12 of the compressor due to the amplitude variation as in FIG. 2(b), which corresponds to the amplitude waveform shown in FIG. 4(b). The counter-electromotive force Ec assumes a waveform as in FIG. 4(c), which is zero at the top dead point and the bottom dead point. There is a time difference between the compression stroke T1 and the suction stroke T2. As a consequence, the waveform of the counter-electromotive force Ec is not perfectly sine waveform but distorted. The waveform generated against the compressor impedance Z which varies with lapse of time consists of the basic waveform plus the waveform of FIG. 4(c). This waveform is minimum at the zero counter-electromotive force and maximum at the maximum counter-electromotive force, as shown in FIG. 4(d).

Assume that a square waveform voltage $V_I$ as in FIG. 4(e) in phase with the voltage Ec of FIG. 4(c) is applied to the compressor. Then a current $I_L$ as in FIG. 4(f) is produced, which is maximum at the minimum impedance Z, and minimum at the maximum impedance Z. Thus, the voltage $V_I$ is coincident with the current $I_L$ in terms of phase.

Actually, the current $I_L$ is in the waveform rising not perpendicularly and reaches its maximum value as in FIG. 4(g) due to the reactance offered in the compressor including the power circuit. This causes a delay time $t_1$ in the compression stroke, and a delay time $t_2$ in the suction stroke. Accordingly, the rise portion of the waveform of the current $I_L$ is curved.

Therefore, to allow the electrical vibration type compressor to operate with its maximum efficiency by unidirectional current of square waveform, it is necessary that the waveform of the drive current be coincident with the amplitude waveform of the vibration system.

In view of the foregoing, the present invention employs a method of converting a unidirectional power source voltage into an alternating voltage whose waveform is coincident with the amplitude of the vibration system of the compressor. To this effect, a control transformer of unsaturated core type and one or more semiconductor switching elements are used to turn on and off the unidirectional power source voltage to produce an alternating voltage. In the DC-AC conversion, the switching characteristics of the semiconductor switching element are effectively utilized. The semiconductor switching element with a control electrode, such as transistor and thyristor, is suited for this purpose.

The features and advantages of the invention will become more apparent from the description given below by way of example.

EXAMPLE 1

Figure 6:
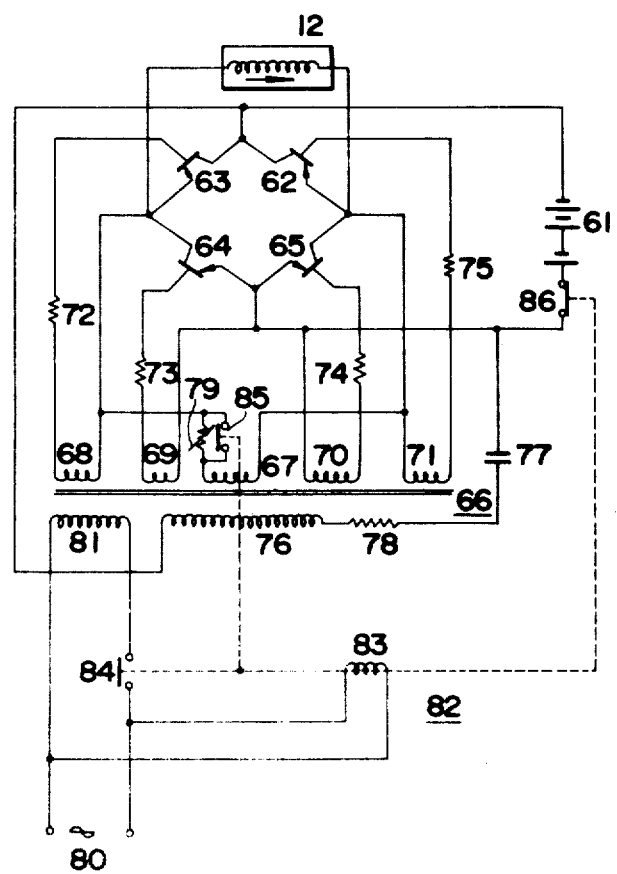

Referring to FIG. 6, there is shown a circuit comprising a bridge circuit. This bridge circuit is constituted of a unidirectional power source (or DC power source) 61, semiconductor switching elements 62, 63, 64 and 65 of the type having a control electrode using transistor, and a drive coil 12 such as described previously. The primary winding 67 of a control transformer 66 is connected in parallel to the drive coil 12. The secondary windings 68, 69, 70 and 71 of the control transformer 66, which control the transistors, are disposed so that a pair of transistors 62 and 64, and a pair of transistors 63 and 65 are turned on and off by the pair.

The reference numerals 72, 73, 74 and 75 indicate balancing resistors connected to the control circuit of the transistors. The numerals 76 and 77 stand for a starting winding and a capacitor, respectively. The winding 76 is wound on the core of the control transformer 66. A resistor 78 is connected into the starting circuit, and series resistor 79 is connected into the primary winding 67 by which the base current to the transistors 62, 63, 64 and 65 is controlled. Numeral 80 identifies a commercial AC power source, 81 the primary winding for AC power, wound commonly on the core of the control transformer 66, while 82 is a relay for automatically switching the power from DC to AC when the compressor is driven from an AC power source, 83 a coil for exciting the relay 82, and 84, 85 and 86 are switch contacts.

In FIG. 6, when the AC power source 80 is off and the DC power source 61 is on, the exciting coil 83 of the relay 82 is not excited. Hence, the contacts 84 and 85 are opened, and the contact 86 is closed. As a result, current flows from the DC source 61 through the capacitor 77, resistor 78, and starting winding 76 of the control transformer 66, to drive the transistors 62 and 64 at a negative potential with respect to the emitter, and the transistors 63 and 65 at a positive potential with respect to the emitter. Consequently, the transistors 62 and 64 turn on, and 63 and 65 turn off. At the instant when the transistors 62 and 64 turn on, the collector currents of these transistors flow in the primary winding 67 through the series resistor 79 to thereby cause the secondary windings 69 and 71 to be further excited. Then the larger collector currents of the transistors 62 and 64 pass through these secondary windings in the arrow-marked direction in view of the coil 12. Accordingly, the coil 12 and the piston 27 start moving from the bottom dead point, i.e. the position 51 indicated in FIGS. 2(a), 2(b) and 4(b), toward the top dead point, i.e. the position 53, along the direction of the electromagnetic force of the drive system.

At the same time, as shown in FIG. 6, the transistors 62 and 64 become saturated and the voltage drop between the collector and emitter is considerably reduced. As a result, most voltage of the DC source 61 is applied to the drive coil 12, and the current $I_L$ passing through the coil 12 increases to a value corresponding to the voltage of the power source 61. This current $I_L$ is equal to the collector current $I_C$ of the transistors 62 and 64. The collector current $I_C$ continues flowing as long as the following condition holds.

$$I_B \cdot h_{FE} \geq I_C \quad (1)$$

where $I_B$ represents the base current and $h_{FE}$ the current amplification factor. Under this condition, the drive coil 12 continues moving in the same direction. As shown in FIG. 4(g), the collector current $I_C$ increases or decreases inversely proportional to the counter-electromotive force, i.e. the impedance. Thus, $$I_B \cdot h_{FE} < I_C \quad (2)$$

Therefore the transistors 62 and 64 are carried from their saturation regions to linear regions and then cut off.

According to the invention, an unsaturated core type transformer is employed for the control transformer 66 to maintain linear characteristics in the operation where the output should always be substantially proportional to an input signal in response to variations in the power source voltage and variations in the natural vibration of the mechanical system owing to an external condition, and the output signal be free of distortion. This principle holds in the embodiments to be described hereinafter. The counter-electromotive force across the coil 12 becomes zero, as in FIG. 4(c), at the top and bottom dead points of the piston 27. When the drive coil 12 reaches the top dead point 53, the counter-electromotive force in the coil 12 disappears whereby the collector current progressively increases as indicated by the waveform (g) in FIG. 4. Simultaneously, the current flowing through the primary winding 67 of the control transformer 66 disappears, with the result that a counter-electromotive force is induced to cause the base currents of the transistors 63 and 65 to flow in the windings 68 and 70. This makes the transistors 63 and 65 conducting. In view of the drive coil 12, the collector currents of the transistors 63 and 65 flows opposite to the direction where the transistors 62 and 64 are conducting. Accordingly, the piston 27 starts moving from the top dead point 53 to the bottom dead point 51. When the piston 27 reaches the bottom dead point 51, the transistors 63 and 65 turn off, a counter-electromotive force is induced across the secondary windings 69 and 71 of the control transformer 66, the transistors 62 and 64 resume their on states, and the drive coil 12 starts moving from the bottom dead point 51 to the top dead point 53. A series of these operations are performed under the control of the semiconductor circuit through the reciprocating motion of the drive coil 12 and piston 27 connected to the drive coil 12, under the foregoing premise condition set in terms of relationship among the amplitude (b), the voltage $V_l(e)$, and the load current $I_L(f)$ in FIG. 4.

Thus, with the above relationship satisfied, the vibration cycle of the electrical vibration system is made coincident with that of the mechanical vibration system. In the above example, this relationship always holds even if the natural vibration cycle of the electrical vibration type compressor varies with change in the discharge and suction pressures, and the cycles T1 and T2 as in FIG. 4 vary. In other words, the condition necessary to establish the foregoing maximum efficiency is always satisfied.

A series circuit comprising a capacitor 77, a resistor 78, and a winding 76 of the control transformer is connected in parallel across the both terminals of the undirectional power source, which starts the circuit and functions to compensate for the transient power appearing when power is on. This circuit will not operate once the semi-conductor switching begins.

When the drive coil 12 is disconnected from the electrical vibrations system which comprises switching elements, the transistors perform switching according to the switching condition which depends on the characteristics of the unsaturated core type control transformer 66 in a saturated range beyond its linear characteristic and the electrical vibration system come to no load oscillation.

In FIG. 6, the semiconductor control circuit operates in the following manner when an AC power source 80 is supplied. First, the exciting coil 83 of the relay 82 is excited which causes the contacts 84 and 85 of the relay 82 to close and the contact 86 to open. Consequently, the DC power source 61 is desconnected from this control circuit, and the voltage from the AC power source 80 is applied to the primary winding 81 of the transformer. An AC magnetic flux is produced in the core of the transformer 66. Therefore an AC voltage is generated across the primary winding 67 to which a DC power is supplied from the DC power source 61 in a certain direction. The value of the AC voltage depends upon the number of turns of the primary winding 67. This AC voltage is applied across the drive coil 12. At this time no circulating current flows from one terminal to another or from one arm to another in the bridge comprising transistors 62 through 65 since the transistors 62 and 64, and the transistors 63 and 65 are alternately controlled. Thus, the drive coil 12 is excited by the AC power, to start vibration at the cycle of the power source. Under this condition, the vibration type compressor operates in the same characteristics as those of a commercially available vibration type compressor adapted to an AC power source. This principle applies to the other embodiments of the invention.

In this example, as has been described, the mechanical and electrical vibration systems vibratorily accord with each other by using a unidirectional power source such as battery, and the systems are operated with minimum consumption of power, i.e., at the maximum efficiency. This electrical vibration type compressor may readily be operated from an AC power source automatically switched from the DC source. The transformer used in this example operates as a control transformer when the compressor is powered from a DC power source, or as a potential transformer, when it is driven from an AC power source. This arrangement obviates the individual need for the output transformer, the control transformer and the commercial power transformer as the conventional device, and serves to simplify the construction of the compressor.

EXAMPLE 2

Another embodiment of the invention is described with reference to FIG. 7(a) of the drawing wherein the numeral 61 denotes a unidirectional power source, and 62 and 62' denote semiconductor switching elements of the type provided with a control electrode using transistors. When the compressor is driven from the unidirectional power source, the circuit comprising the primary windings 67 and 67' of the control transformer 66 connected to the collector of the transistors 62 and 62' forms a push-pull circuit. More specifically, the control windings 71 and 71' of the control transformer 66 are connected to the bases of the transistors 62 and 62', respectively. The common terminal of these control windings 71 and 71' is connected to the emitter common to the transistors 62 and 62'. The control windings are wound so that the two transistors can alternately be turned on and off. A drive coil 12 is connected to the collectors of the transistors 62 and 62', and the coil 12 is further connected in parallel to the primary windings 67 and 67' of the control transformer 66. Numeral 80 indicates an AC power source such as a commercial supply, and 81 identifies a primary winding wound on the core of the control transformer 66 for the purpose of receiving an AC power. Relay 82 includes an exciting coil 83 and contacts 84 and 86.

The above circuit is operated in the following manner. When the unidirectional power source 61 is connected and the AC power source 80 is disconnected, the coil 83 of the relay 82 is not excited which causes the contact 84 to open and the contact 86 to close. Under this condition the control circuit is driven from the unidirectional power source 61. Therefore the base current flows in the transistors 62 and 62' by a starting resistor 87. At the same time, the collector current of transistor 62 flows through the winding 67 while the collector current of transistor 62' flows through the winding 67'. (In FIG. 7(a) the black dots indicate the winding direction in view of the core. For the sake of simplicity, the lower end opposite to each black dot is assumed to be the beginning of each winding.) By these currents, the core of the control transformer 66 is excited in such a manner that the excitation by the winding 67 is inverse to the excitation by the winding 67' and cancelled by the latter. In practice, there is a difference between the two excitation forces due to characteristic disuniformity of the transistors 62 and 62'. As a result, the core of the transformer 66 is excited in one direction. This means that potentials are produced across the control windings 71 and 71' wound on the same core. Due to these potentials, one of the transistors 62 and 62' whose collector current is larger than that of the other is caused to pass base current, and the base of the other transistor is reversely biased.

In this manner one of the transistors is made on state perfectly, and the other cut-off state. Under this condition, almost whole voltage of the unidirectional power source 61 is applied to either one of the primary windings 67 and 67' of the control transformer. (This is because the transistor in the on state causes a very small voltage drop across its emitter and collector. When it is in the cut-off state, no current flows therethrough.) Thus no voltage reaches the other winding 67' (or 67) from the unidirectional power source. By the primary winding to which the whole voltage of the unidirectional power source is being applied, an excitation force is developed in the core of the transformer, thereby causing a voltage to be produced across the other winding. This voltage, dependent on the number of turns and the winding direction thereof, is a summing voltage representing the sum of the two voltages of the primary windings 67 and 67' since, according to the invention, the drive coil 12 has its both ends connected to the collector terminals of the windings 67 and 67' of the control transformer 66. When the windings 67 and 67' have the same number of turns, the voltage across the winding 67 is nearly equal to that across the other winding 67', and hence the voltage applied to the drive coil 12 is twice that present across the winding 67 or 67', or nearly twice the voltage of the unidirectional power source 61.

As a consequence, the drive coil 12, together with the piston 27 interlocking with the coil 12, starts moving from the bottom dead point 51 according to the cycle shown in FIG. 2(a), for the same reason explained above in connection with the example in FIG. 6. The voltage resulting from the windings 67 and 67' is applied to the drive coil 12, and a current inversely proportional to the counter-electromotive force due to the coil 12 flows therethrough in the correlation shown in FIGS. 4(b)–4(g) similar to the operation described in FIG. 6. The collector current $I_C$ of the transistor in the on state is the sum of the current flowing through the coil 12 and the current passing through either winding 67 or 67' which is supplied with voltage from the unidirectional power source by way of the transistor in the on state. The excitation loss in the control transformer 66 and other losses are negligibly small. Therefore, if the windings 67 and 67' have the same number of turns, the current flowing through one side of the primary winding 67 or 67' is equal to that flowing through the drive coil 12. This is indicative of the fact that the current supplied to one of the windings 67 and 67' via the transistor in the on state is to compensate for the current flowing through the other winding, or is equal to the current passing through the drive coil 12. Under this condition, the collector current $I_C$ is approximately twice that flowing through the drive coil 12. The collector current $I_C$ of the transistor in the on state changes with changes in the current passing through the drive coil 12. Accordingly, this collector circuit will remain as long as the foregoing condition (1) holds.

In this example, as in the first embodiment, the transistor in the on state is made to turn off and becomes cutoff state, and the other one on state when the condition (2) is satisfied, because the core of the control transformer 66 is unsaturable. Thus, the vibration cycle of the electrical vibration system coincides with that of the mechanical vibration system.

Figure 7A:
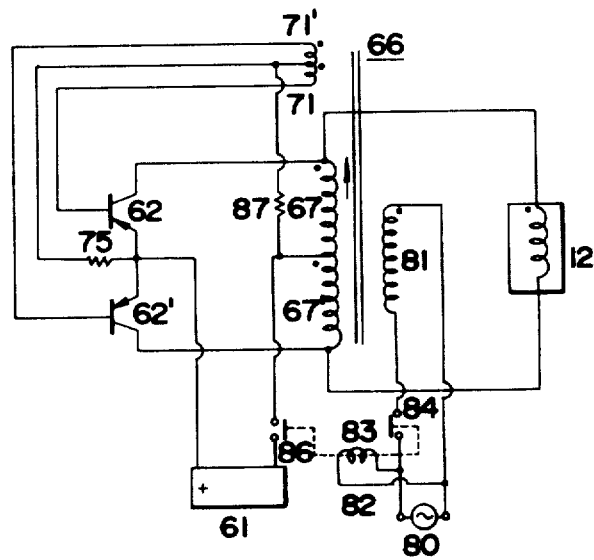

In FIG. 7(a) when power is supplied to the circuit from the AC power source 80, the exciting coil 83 of the relay 82 is energized which causes its contact 84 to close and 86 to open. As a result, the unidirectional power source 61 is disconnected from the control circuit, and, at the same time, the AC power source 80 is applied to the primary winding 81 of the control transformer 66, and an AC flux is developed across the core of the transformer 66. This results in an AC voltage across each of the primary windings 67 and 67' in proportion to the numbers of their respective turns. These voltages are applied to the drive coil 12, or the drive coil 12 is driven from AC power.

EXAMPLE 3

Figure 8C:
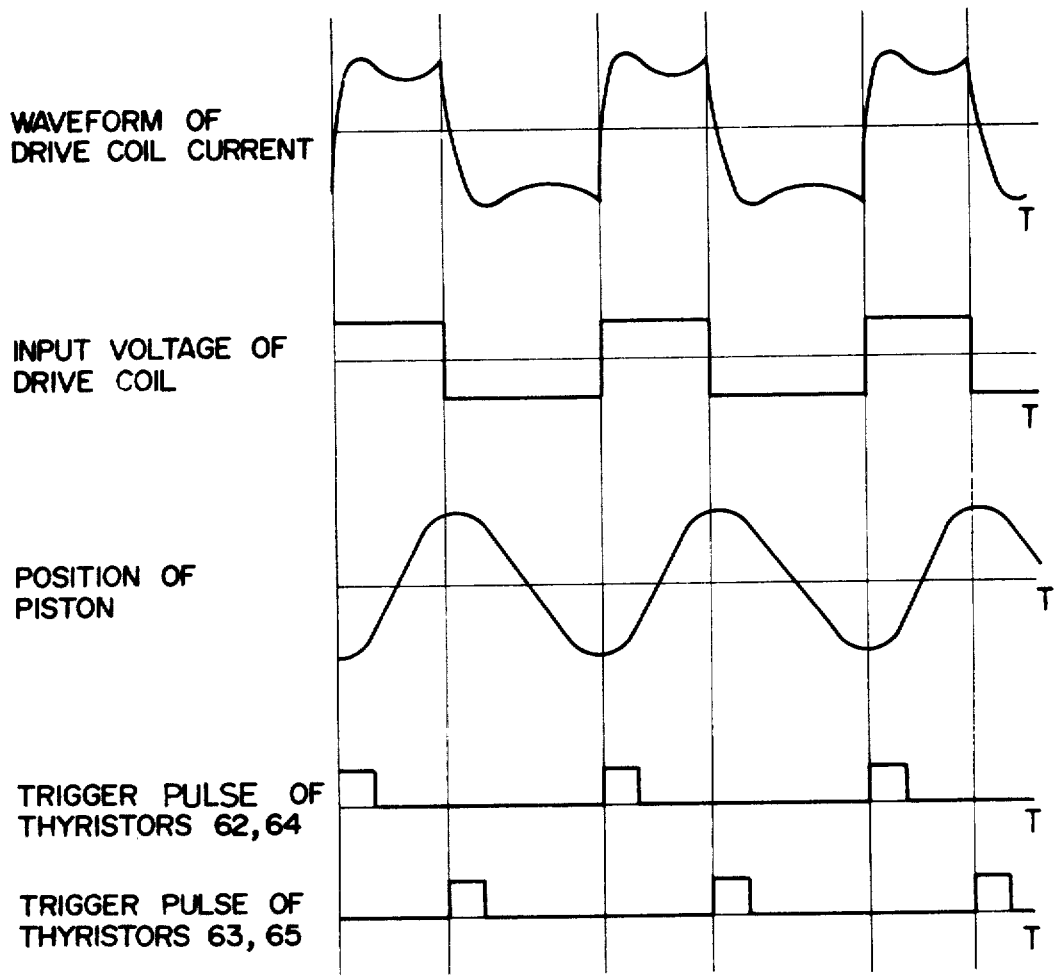
FIGS. 8(c) and 16(c) are diagrams showing the vibratory states of the electrical and mechanical vibration systems of the compressor of the present invention. In the drawings, certain parts indicated by same mark or letter are shown exactly same or same characteristic.

This example uses rectifier elements with a control electrode, such as thyristor, here-under in the present invention explain for the example in case of using thyristor for the purpose, as shown in FIGS. 8(a)–8(d). The numeral 12 represents a drive coil, 61 a unidirectional power source, 62, 63, 64 and 65 thyristors 66 a control transformer, 67 the primary winding of the transformer used when the circuit is driven from the undirectional power source 61, 67' and 67 part of the primary winding 67 being tapped from both ends of the winding 67 and forming an auto-transformer, 80 an AC power source such as a commercial service power, 81 a winding for AC power input, 82 a relay, 83 an exciting coil of the relay, 84, 85 and 86 contacts thereof, 88 and 89 commutation reactors, 94, 95, 96 and 97 windings of these reactors, 90, 91, 92 and 93 commutation capacitors, 98, 99, 100 and 101 feedback diodes, 102 a current transformer comprising a primary winding 103 and secondary windings 104 and 104', and 105 a trigger circuit as shown in FIG. 8(b).

This control circuit is operated in the following manner. In FIG. 8(a), when the AC power 80 is disconnected from the control circuit, and the unidirectional power source 61 is connected, the exciting coil 83 of the relay 82 is energized. In this state the contact 84 is opened and the other contacts 85 and 86 are closed. Therefore, the trigger circuit 105 receives power from the unidirectional power source 61 and in turn generates a trigger pulse so as to cause the thyristors 62 and 64, and 63 and 65 to be triggered by the pair alternately. Thus, when the thyristors 62 and 64 are in the on state, the current from the positive terminal of the unidirectional power source 61 passes through the winding 94 of the reactor 88 by way of the thyristor 62. Part of this current goes through the primary windings 67', 67 and 67" on the side of the unidirectional power source, and further through the winding 96 of the reactor 89. This current is then fed back to the power source 61 by way of the thyristor 64. Another part of the current passes through the primary winding 103 of the current transformer 102, the drive coil 12, the winding 96 of the reactor 89, and the thyristor 64. Because this current flows in the drive coil 12 in the arrow-marked direction, the drive coil 12 and the piston 27 move in either direction as in FIG. 2(a). At the same time, since the thyristors 62 and 64 are turn-on, the commutation capacitors 91 and 93 are charged to approximately the voltage of the unidirectional power source 61.

When the thyristors 63 and 65 are triggered into the on state by the trigger pulse from the trigger circuit 105, the charges stored across the capacitors 91 and 93 are discharged through the reactor winding 95 and the thyristor 63, and through the thyristor 65 and the reactor winding 97, respectively. At this moment, the induced voltage generated in the reactor windings 94 and 95 by electromotive force turns off the thyristors 62 and 64 which are in the on state. As a result, the current from the unidirectional power source 61 is reversed in the drive coil 12 whereby the drive coil 12 and the piston 27 start moving in the reverse direction. This operation cycle repeats in synchronism with the trigger pulse, as described more fully below, to allow the drive coil 12 and the piston 27 to reciprocate.

In this example, the electrical and mechanical vibration cycles are made coincident through the thyristors 62, 63, 64 and 65 which are turned on and off by the trigger pulse from the trigger circuit 105 shown in FIG. 8(b).

More specifically, in FIG. 8(b), reference number 102 denotes a current transformer as in FIG. 8(a), and 105 is a trigger pulse generator as in FIG. 8(a). The numerals 106 and 106' represent voltage comparator circuits of the type similar to the Schmitt trigger circuit, 107 and 107' pulse shaping circuits of the type similar to the monostable multi-vibrator, 108 and 108' pulse amplifiers comprising pulse transformers, 109, 110, 109' and 110' output terminals of these pulse amplifiers, and 111 and 111' diodes connected between the current transformer 102 and the voltage comparator circuits 106 and 106'. Numeral 112 indicates a resistor, and 113 a power input terminal of the trigger pulse generator. The input terminal of the trigger pulse generator is connected to the secondary windings 104 and 104' of the current transformer 102. One end of the power terminal 113 is connected to the positive side of the unidirectional power source while the other end is connected to the contact 85 of the relay 82. When the circuit is driven from the unidirectional power source as in FIG. 8(a), the negative side of the terminal 113 is connected to this power source 61. The output terminals 109 and 110 of the pulse transformers of the pulse amplifier circuits 108 and 108' are connected to the thyristors 63 and 65, and the other output terminals 109' and 110' to the thyristors 62 and 64 as in FIG. 8(a).

When the thyristors 62 and 64 are in the on state, the current from the unidirectional power source flows in the primary winding of the current transformer 102, thereby inducing voltages across the secondary windings 104 and 104'. As a result, a current flows in the resistor 112 which causes a voltage to be developed across the resistor 112. The waveform of the voltage is coincident with that of the current passing through the drive coil 12. The voltage produced across the drive coil 12 is proportional to the current flowing through the primary winding 103. The voltages developed across the secondary windings 104 and 104' are applied to the comparator circuits 106 and 106' through the diodes 111 and 111'. When the thyristors 62 and 64 are in the on state, no voltage reaches the comparator circuit 106' since the diode 111' is reversely conducting. Instead, an input voltage signal is supplied to the comparator circuit 106. This comparator circuit 106 generates a pulse when the given input reaches a certain voltage level, thereby driving the pulse shaping circuit 107 of the following stage. Theh output of the pulse shaping circuit is supplied to the pulse amplifier 108. The resultant output of the pulse transformer is supplied to the thyristors 63 and 65 to make these thyristors turn on. At the same time, the other thyristors 62 and 64 become cut-off for the reason previously described. Under this condition, the current flowing through the drive coil 12 is inverted or opposite to the arrow-marked direction in FIG. 8(a).

Thus, the drive coil 12 begins moving in the reverse direction. Simultaneously, the current flowing through the primary winding 103 of the current transformer 102 is inverted. Also, the voltage across the secondary windings 104 and 104' are inverted. In this state, because the voltage across the secondary winding 104 is opposite to the diode 111, no voltage reaches the comparator circuit 106. The voltage across the secondary winding 104' is forward in view of the diode 111' and hence reaches the comparator circuit 106'. Accordingly, the voltage across the secondary winding 104' exceeds the comparison voltage, with the result that the comparator circuit 106' generates a pulse, and the pulse shaping circuit 107' is driven. The output of the pulse shaping circuit 107' causes the amplifier circuit 108' to generate trigger pulses from the output terminals 109' and 110' of the pulse transformer. In this manner, the thyristors 62 and 64 are turned on and the other thyristors 63 and 65 are turned off. This is one cycle of the control operation.

This on and off cycle depends on the condition, $E_M = K.I_M$, where $E_M$ stands for the voltage across the drive coil 12, $I_M$ for the current in the drive coil 12, and K for the conversion ratio of the output voltage of the secondary windings 104 and 104' of the current transformers 102 and 102' to the primary current. However, if $E_O > E_M$ (where $E_O$ is the comparison voltage of the comparator circuits 106 and 106'), the trigger circuit 105 does not generate a pulse. It does generate a pulse when $E_O < E_M$. Accordingly, as long as the condition $E_O > K.I_M$, holds, the thyristors 62, 63, 64 and 65 exhibit on inversion from one state to another. When $E_O < K.I_M$, the thyristors alternately invert their on and cut-off states. A series of these control operations are performed on the same principle as illustrated in the previous embodiments.

To be more illustrative, FIG. 8(c) shows the correlation among the piston position, the input voltage, the drive coil current, and the trigger voltage. The relationship $E_O > K.I_M$ occurs because the current passing through the drive coil 12 increases at the top dead point and the bottom dead point of the piston, i.e., at the position where the counter-electromotive force across the drive coil is minimum. This signifies the fact that the vibration cycles of the electrical and mechanical vibration system coincide with each other as in the embodiments described above with reference to FIGS. 6 and 7.

A capacitor 121' and a resistor 122' which are connected in series between the gate and the anode of the thyristor 62, and a capacitor 121 and a resistor 122 which are connected in series between the gate and the anode of the thyristor 64, as shown in FIG. 8(a), constitute a start compensation circuit which turns on these thyristors immediately when the unidirectional power source is switch in. The turn-on of the thyristor for the first time after the power is on is effected by the signal supplied through the capacitor and resistor to the gate of the thyristor. In the embodiment as in FIG. 8(a), the starting is initiated according to the thyristors 62 and 64. This control is common to the embodiments shown herein. The circuit, after this starting control, operates in the same manner as previously described.

In FIG. 8(a), assume that the AC power 80 is applied to the control circuit. Then the exciting coil 83 of the relay 82 is energized, the contact 84 is closed, the contacts 85 and 86 are opened, and the trigger circuit 105 is disconnected from the other circuits so that no pulses are generated. Because the contact 84 is closed, the AC power is supplied to the AC power input winding 81 of the control transformer 66. As a result, voltages are induced across the primary windings 67', 67 and 67" which are wound on the same core and used when the control circuit is driven from the unidirectional power source. These voltages cause an AC current to flow through the drive coil 12 by way of the primary winding 103 of the current transformer 102. At this moment, voltages are produced across the secondary windings 104 andd 104' of the current transformer 102. However, this cannot cause the trigger circuit 105 to generate any pulse since the contact 85 is opened to disallow power supply to this trigger circuit. Therefore no circulating current will flow through the control circuit. It is evident that this embodiment leads to the same effects as in the previous embodiments illustrated in FIGS. 6 and 7.

The invention is not limited to the foregoing embodiments. For example, the primary winding 103 of the current transformer 102 may be connected in the circuit as shown in FIG. 8(d) which will entail very little loss in the control transformer 66 and hence substantially satisfy the above conditions of the invention. Even if the drive coil 12 is disconnected from the circuit during operation, such disconnection will not serve as a cause of destroying the electrical vibration circuit but oscillation will be maintained at a vibration cycle determined by the saturation characteristic of the control transformer.

EXAMPLE 4

FIG. 9 shows by circuit diagrams another embodiment of the invention using thyristor.

In FIG. 9 of the drawing, the reference numeral 12 represents a drive coil, 61 a unidirectional power source, 62 and 64 thyristors, 66 a control transformer, 67, 67' and 67" primary windings of the control transformer 66 used when the circuit is driven from the unidirectional power source, 80 an AC power source, and 81 the primary windings of the control transformer used when the circuit is driven from the AC power source. A relay 82 has an exciting coil 83 and contacts 84, 85 and 86. Numeral 88 is a commutation reactor, 114 a winding of the reactor, 98 and 99 feed back diodes, 115 a commutation capacitor, 102 a current transformer, 103 the primary winding of the current transformer, 104 and 104' secondary windings thereof, and 105 a trigger circuit similar to one described in Example 3 for alternately turning the thyristors 62 and 64 on and off. This example uses one pair of thyristors instead of the two pairs used in Example 3. In this example, therefore, the trigger output is provided in a pair, as indicated by 109 and 109' in FIG. 8(b).

In FIG. 9(a), when the AC power source 80 is disconnected, the circuit is driven from the unidirectional power source 61, as in Example 3. Under this condition, the thyristor 62 is in the on state and the other thyristor is in the off state. The current from the unidirectional power source goes through an intermediate tap of the primary winding of the control transformer, the thyristor 62 via the upper half of the winding, and returns to the terminal of the power source 61 by way of the winding 114 of the reactor 88. Therefore the capacitor 115 is charged by the voltage cross the primary winding 67 of the control transformer. The thyristor 64 is turned on by being given at its gate a trigger pulse from the trigger circuit 105. Accordingly, the thyristor 62 is reversely biased by the capacitor 115 and turned off. The power current passes through the intermediate tap of the primary winding 67 of the control transformer 66 and returns to the power source 61 by way of the lower half of the primary winding 67 and thyristor 64. As a result, the capacitor 115 is inversely charged to be ready to turn off the thyristor 64 when the thyristor 62 is turned on.

Thus, an AC voltage appears across the winding 67 of the control transformer 66 as a result that the thyristors 62 and 64 alternatively repeat on and off. The drive coil 12 is driven by this AC voltage. The current flowing through the drive coil 12 goes in the primary winding 103 of the current transformer 102 and to the trigger circuit 105. The resultant trigger pulse is applied to the thyristors 62 and 64. A series of these operations lead to the same effects as in the embodiment illustrated in FIG. 8(a), permitting the vibration cycles of the electrical and mechanical vibration systems to coincide with each other.

Figure 9B:
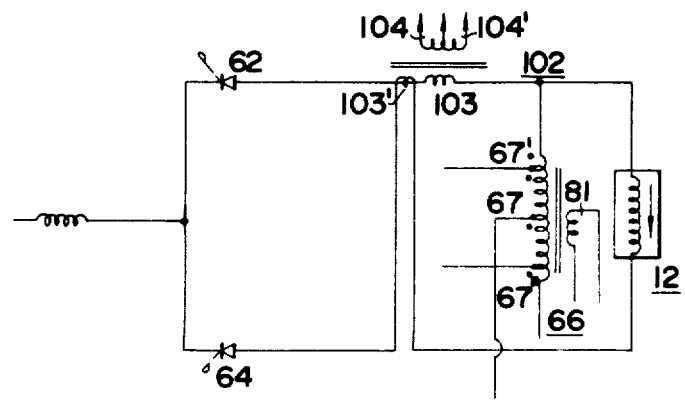

The control under which the circuit is driven from the AC power source 80 is performed in the same manner as in Example 3. FIG. 9(b) shows a modification of the connection of the primary winding of the current transformer 102 as in FIG. 9(a.). This arrangement is such that the current transformer 102 is provided with two primary windings each being responsible for half of the cycle. The winding 103 detects the anode current of the thyristor 62, and the other winding 103' detects the anode current of the other thyristor 64. In this circuit, the current of the control transformer 66 is also the primary current of the current transformer 102. The loss in this control transformer due to the primary current is negligibly small in view of expected control functions of the circuit. Even if the drive coil 12 is disconnected from the circuit, this will not result in a nonoscillating state, for reasons explained in Example 3 with reference to FIG. 8(c).

Additional examples embodying this invention on the basis of Examples 1 through 4 will be described below.

In Example 1, PNP transistors are used for the switching elements in the manner shown in FIG. 6. Instead, the combination of NPN and PNP transistors may be used, as shown in FIG. 10. In this case, the transistors 63 and 64, and 62 and 65, respectively, should be connected their collectors in common. When these transistors are of the type with their collectors used as the flange, the collectors of each pair serve as a common heat-sink. In Example 1, shown in FIG. 6, all the transistors on the bridge arms may be of NPN type.

Figure 7B:
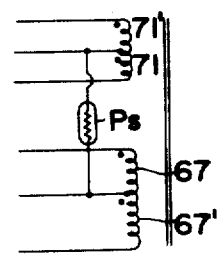
Figure 11:
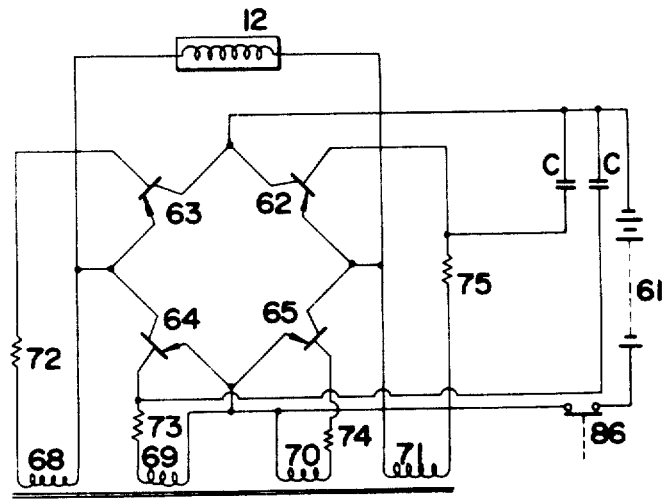

The starting circuit in Example 1 may be arranged in the configuration as shown in FIG. 11 wherein a capacitor C is used at the beginning of the drive in the state of unbalance between the two bridge arms comprising transistors 63 and 65, and 62 and 64. The control elements used for this purpose may include capacitors and resistors, or semiconductor variableresistance elements such as thermistors PS of positive characteristic can be used at the individual center points of the windings 67, 67', 71 and 71', as shown in FIG. 7(b), to allow a large current to flow at the start of operation and smaller current to flow thereafter due to self-heating in the elements. This will reduce the losses in the starting circuit.

In the foregoing embodiments, it is apparent that the control circuit may be solely adapted to the unidirectional power source. In this case, the use of the relay 82 may be omitted. Also, when transistors are used as the switching elements, these switching elements may be connected in the form of Darlington pair. In such case, the $h_{FE}$ value of the transistor is considered as the product of two $h_{FE}$ values of each paired transistors. Theoretically this meets the condition of the control required according to the invention as described in the above embodiments. Examples of this modification are illustrated by circuit diagrams in FIGS. 14(b), (c), (d) and (e).

Figure 12:
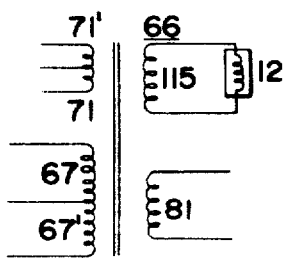

In the examples of the invention disclosed herein, it may be so arranged that an independent output winding 115 is added to the control transformer 66 and connected across the drive coil 12 as shown in FIG. 12. Then it becomes possible to allow the control transformer to possess a proportional characteristic relationship between its primary and secondary sides, provided that the transformer is of unsaturated core characteristic. (This is apparent in view of the principle of the transformer.) Thus, the change ratio in the current on the primary side of the transformer is equal to the change ratio in the secondary current which is due to the impedance change across the drive coil. In other words, the current change ratio on the primary side of the transformer is equal to the current change ratio across the drive coil. This arrangement does not detract from the advantages available with the invention disclosed herein in its embodiments, but makes it possible to supply current to the drive coil in meet with the rating voltage of the compressor.

The principles pertaining to the circuits shown in FIGS. 14(a) through 14(e) are applicable not only to bridge configurations but to control circuits comprising switching element transistors. FIG. 14(a) shows a circuit comprising four transistors as semiconductor switching elements, connected in a bridge form, of which a PNP type and an NPN type make up a pair. Each pair of transistors have their collectors in common. The common collectors of the individual pairs are connected respectively to the two ends of the drive coil. The emitters of the two PNP transistors are connected to the positive side of the unidirectional poewr source, and the emitters of the two NPN transistors are connected to the negative side of the unidirectional power source. The transistors of the same structure type have in common between their emitters and bases the control winding of the unsaturated core type control transformer. A diode is inversely connected between the emitter and the base of each transistor, thereby forming a bridge-like feedback mechanism together with the base circuit. This bridge arrangement is simpler than that shown in FIG. 6 with respect to the base circuit.

FIG. 15 shows another bridge circuit arrangement comprising four transistors, of which a PNP type and an NPN type make up a pair. The emitters of a pair of transistors are connected in common, so as the bases in common. The common emitters of the individual pairs are connected respectively to the two ends of the drive coil 12. The collectors of the two PNP transistors are connected to the negative side of the unidirectional power source, and the collectors of the two NPN transistors are connected to the positive side thereof. Each pair of PNP and NPN transistors have in common between their bases and emitters the control winding of the control transformer. The mutually opposite transistors form a full-wave rectifier type feedback circuit. According to this arrangement, the feedback circuit configuration can be much simplified.

EXAMPLE 5

Figure 13A:
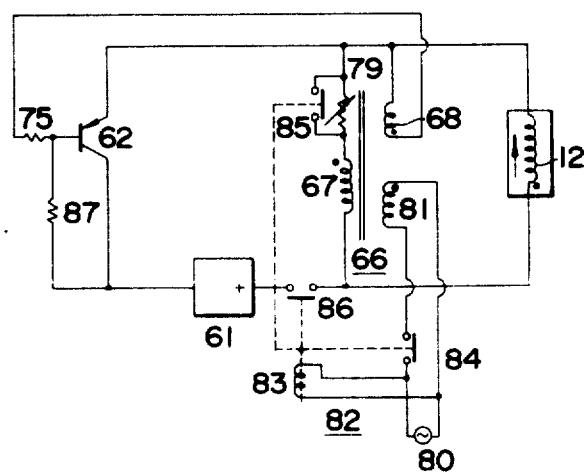

Referring to FIG. 13(a), numeral 62 represents a transistor, 66 a control transformer, 67 a primary winding of the control transformer used when the circuit is driven from a unidirectional power source 61, and 68 a feedback winding of the control transformer. The feedback winding is connected between the base and the emitter of the transistor 62 by way of a base current control resistor 75 so that power is positively fed back with respect to the transistor 62. Numeral 79 denotes a series resistor of the primary winding 67, 80 an AC power source, 81 a primary winding wound on the core of the control transformer 66 used when the circuit is driven from the AC power source, and 82 a relay for automatically switching the electrical vibration type compressor from the DC source to the AC source when the AC source is connected to the circuit. A relay 82 includes an exciting coil 83 and contacts 84, 85 and 86. Numeral 87 identifies a starting bias resistor.

The control circuit is operated in the following manner. When the AC power 80 is disconnected from the circuit and the unidirectional power is connected thereto, the exciting coil 83 of the relay 82 is not energized which causes the contacts 84 and 85 to open and the contact 86 to close. The current from the unidirectional power source flows in the base of the transistor 62 through the resistor 87 to allow collector current to flow in the transistor 62. Accordingly, current flows through the drive coil 12 and the primary winding 67 of the control transformer 66 by way of the resistor 79, with the result that the core of the control transformer 66 is excited in whichever direction and flux change occurs. A voltage is induced across the feedback winding 68 by the flux change, and a current flows between the base and the emitter. Consequently, the collector current of the transistor 62 further increases to allow current to flow in the primary winding 67 and the drive coil 12. This current serves to increase the flux change across the core of the control transformer 66 and thereby produce a large voltage across the feedback winding 68. As a result, the base current of the transistor 62 further increases until the transistor is fully saturated. Under this condition, all the voltage of the unidirectional power source 61 is applied across the drive coil 12. At the same time current is kept flowing through the primary winding 67 of the control transformer 66 via the resistor 79. Therefore, the drive coil 12 and the piston 27 which interlocks with the coil 12 start moving from the bottom dead point 51 shown in FIGS. 2(a) and 4 on the same principle explained in Example 1 with reference to the functions of the circuit in FIG. 6. When the coil 12 and the piston 27 reach the top dead point 53, the current passing through the drive coil 12, i.e., the collector current of the transistor 62, is maximized, which does not support the foregoing condition (1) but does meet the relationship (2). As a consequence, the transistor 62 is cut-off. Because the voltage of the unidirectional power source 61 is born by the transistor 62, the circuit state is inverted so that the drive coil 12 together with the piston 27, lead springs 20, 20', and the resonance coil spring 17 start moving in the reverse direction at a self-vibrating cycle and reach as far as the opposite extreme position, i.e., the bottom dead point 51 shown in FIG. 2(b). During this process, a counter-electromotive force is developed across the drive coil 12 because the coil 12 passes through a magnetic circuit. This voltage, as shown in FIG. 2(c), is opposite to the direction held when the transistor 62 is conducting. Thus, when the transistor 62 is in the off state and the piston 27 and coil 12 are in the vibrating range between the top dead point 53 and the bottom dead point 51, as shown in FIG. 2(b), the electro motive force induced across the drive coil 12 is applied through the resistor 79 to the primary winding 67 of the control transformer 66. The voltage induced across the feedback winding 68 is inverse with respect to the transistor 62 in the on state, or serves to inversely bias the base-emitter to maintain this transistor in the off state. When the piston 27 and coil 12 reach the top dead point 53, the counter-electromotive force across the coil 12 ceases because the coil 12 becomes still. Under this condition, the control circuit returns to its initial state and is ready for another cycle of operation.

In this example, the collector current $I_C$ continues flowing as long as the collector current of the transistor in the on state changes with change in the current passing through the drive coil 12, and the condition (1) holds. Therefore, as in Example 1, the half cycle of vibration is determined according to the condition (1) while the rest of the cycle is determined by the self-vibrating cycle which depends on such factors as the piston 27, drive coil 12, lead springs 20 and 20', and resonance coil spring 17. Thus the vibration cycles of the electrical and mechanical vibration systems are made coincident with each other with satisfaction.

The circuit is similarly operable when driven from the AC power source 80 through the drive coil 12, as described above in the previous embodiments.

EXAMPLE 6

Figure 16C:
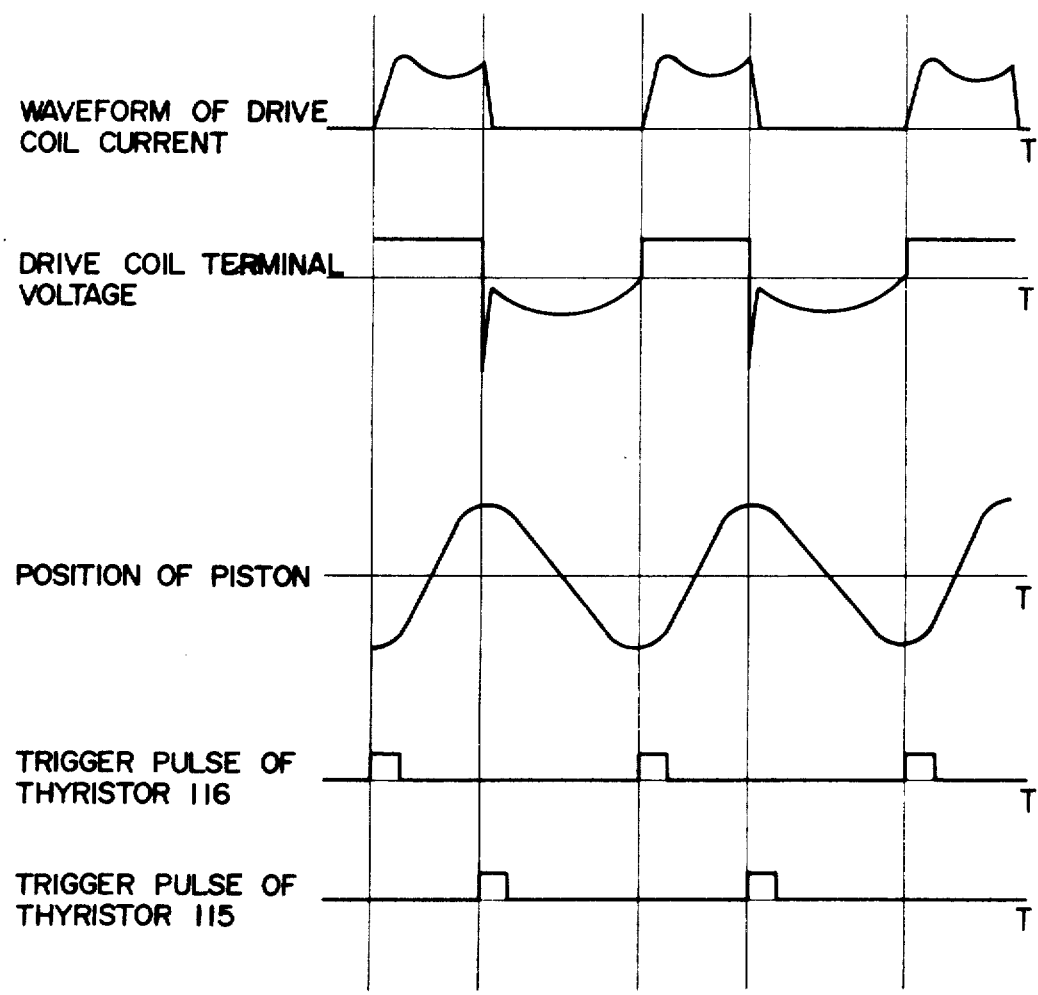
Figure 16A:
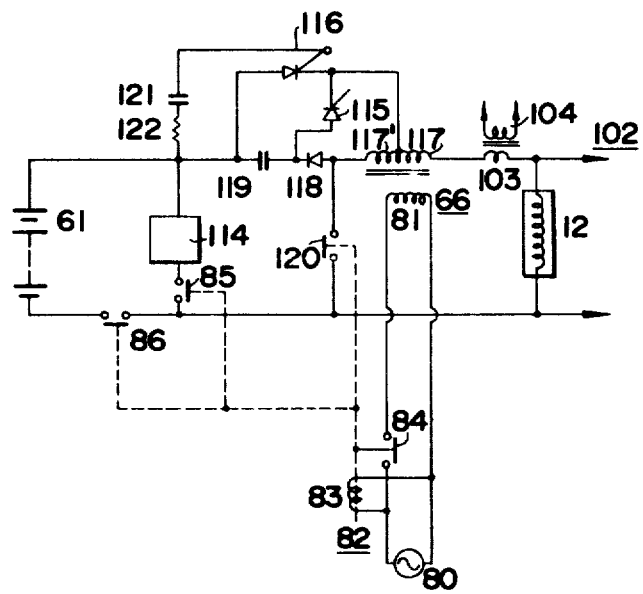
Figure 16B:
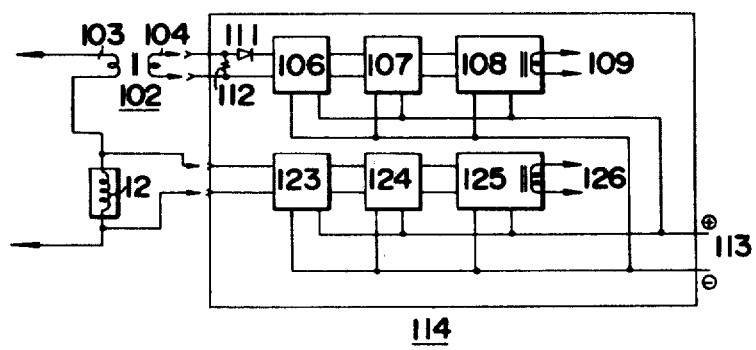

Referring to FIG. 16(a), reference numeral 12 indicates a drive coil, 61 a unidirectional power source, 66 a control transformer, 80 an AC power source such as commercial service supply, and 81 a primary winding used when the circuit is driven from the AC power. A relay 82 has an exciting coil 83 and contacts 84, 85, 86 and 120. A current transformer 102 has a primary winding 103 and secondary winding 104. Numeral 114 denotes a trigger circuit as shown in FIG. 16(b). Also, thyristors 115, 116, are included in the circuit. Thyristor 115 is responsible for the turn-off control on the other thyristor 116. Numerals 117 and 117' represent the primary windings of the control transformer 66 used when the circuit is driven from the unidirectional power source while 118 represents a diode and 119 a commutation capacitor.

When the AC power is disconnected and the unidirectional power source is connected to the circuit, a signal arrives at the gate of the thyristor 116 by way of the resistor 122 and capacitor 121 of starting circuit, thereby making the thyristor 116 turn-on. The anode current of this chyristor goes through the primary winding 117 of the control transformer 66 which causes a current to flow in the drive coil 12 through the primary winding 103 of the current transformer 102. As a consequence, the drive coil 12 and the piston 27 which interlocks with the coil 12 start moving from the top dead point 53 in FIG. 2(a) 12(b), in the same manner as described above in the previous embodiments. When they reach the bottom dead point 51, the current flowing in the drive coil 12, i.e., the current flowing in the primary winding 103 of the current transformer, reaches its maximum value which causes the trigger circuit 114 to generate a pulse as explained more fully below. This pulse goes to the gate of the thyristor 115 to turn of this thyristor. And the other hand, a voltage is induced across the winding 117' due to the transformer function of the primary winding 117 by the current flow the drive coil 12 and the primary winding 117 of the control transformer 66. As a result, the commutation capacitor 119 is charged through the diode 118. The potential across the capacitor 119 gives the thyristor 116 a reverse bias to turn off the thyristor 116 and the thyristor 116 is turned off. Accordingly, the circuit state is inverted and the drive coil 12, the interlocking piston 27, the lead springs 20 and 20', and the resonance coil spring 17 start moving in the opposite direction at the vibration cycle which is determined by these mechanical components. They reach the opposite extreme position, i.e., the bottom dead point 51 of FIG. 2(b). During this process, a counter-electromotive force is developed across the drive coil 12 because the coil 12 passes through the flux present in the magnetic circuit. This counter-electromotive force is opposite to the direction as shown in FIG. 16(c) where the thyristor 116 is in the on state. When the piston 27 and the drive coil 12 reach the bottom point center 51 at which the coil 12 does not move, the counter-electromotive force disappears. This causes output terminal 126 of the trigger circuit 114 to generate a trigger pulse and invert the thyristor 116 on its on state. A series of these operations are repeated to allow the vibration cycles of the electrical and mechanical vibration systems to coincide with each other as in Example 5.

In this control circuit, the trigger circuit 114 functions in the following manner. Referring to FIG. 16(b), numeral 106 represents a voltage comparator circuit, 107 a pulse shaping circuit, and 108 a pulse amplifier circuit. The trigger circuit 114 is a pulse generator circuit comprising these circuits and a pulse transformer which operates like the trigger circuit described in Example 3. When the thyristor 116 in the on state, a current flows in the drive coil 12 by way of the primary winding 103 of the current transformer 102, with the result that a current flows in the secondary winding 104 of the current transformer 102. Consequently, a voltage is induced across the resistor 112. This voltage is applied to the voltage comparator 106. The voltage induced is proportional to the current flowing through the drive coil 12. When this current meets the condition $E_O > K.I_M$, the trigger circuit does not generate a pulse. When it is $E_O < K.I_M$, the trigger circuit generates a pulse. This pulse is applied to the gate of the thyristor 115 from the terminal 109 to make the thyristor 115 turn-on and the other thyristor 116 turn-off for the foregoing reason. Thus, the voltage comparator circuit 106, the pulse shaping circuit 107 and the pulse amplifier circuit 108 make up a circuit to turn off the thyristor 116.

In FIG. 16(b), numeral 123 denotes a zero-cross detector with its input terminals connected the both terminals of the drive coil 12, 124 a pulse shaping circuit, and 125 a pulse amplifier circuit comprising a pulse transformer. The zero-cross detector circuit 123 generates a pulse at the instant a change of direction of the potential across its input terminals. This pulse is shaped by the pulse shaping circuit 124, and the shaped pulse is applied to the pulse amplifier circuit 125. The amplified pulse is applied to the thyristor 116 through the terminal 126 whereby the thyristor 116 is turned on. Thus, the zero-cross detector 123, the pulse shaping circuit 124 and the amplifier circuit 125 make up a circuit to turn on the thyristor 116.

In this manner the thyristor 116 repeats on and off when the piston 27 and the drive coil 12 are at both the extreme positions. The control timings are shown in FIG. 16(c).

The control operation of the circuit driven from the AC power source 80 is described below. When AC power is applied, the exciting coil 83 of the relay 82 is energized which causes its contacts 84 and 120 to close and contacts 85 and 86 to open. Accordingly, the unidirectional power source 61 is automatically disconnected from the circuit, and power is supplied from the AC power source 80 to the circuit by way of the primary winding 81 of the control transformer 66. At the same time, voltages are induced across the primary windings 117 and 117' of the control transformer 66. The resultant power is supplied to the drive coil 12 through the relay contact 120 which is closed, in the same manner as described above in conjunction with the previous embodiments.

Figure 13C:
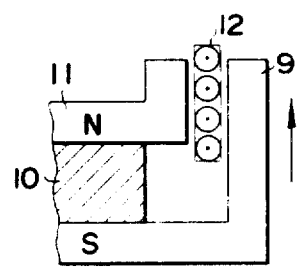
Figure 13E:
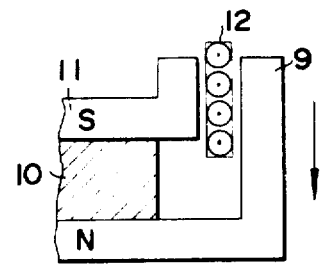
Figure 13D:
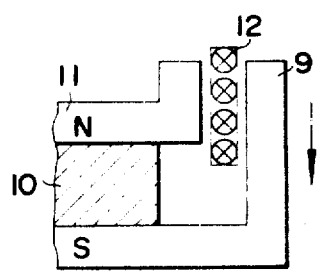
Figure 13F:
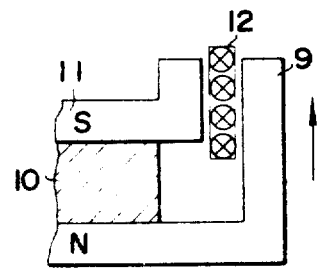

In Examples 5 and 6, when the electrical vibration type compressor is driven by the unidirectional power source 61, the current passing through the drive coil 12 is unidirectional and interrupted. In this fact, the electromagnetic force produced across the drive coil 12 is always unidirectional with respect to the magnetic circuit formed of the magnet 10, the pole piece 11 and the york 9, therefore the electromagnetic force across the drive coil 12 can be maintained unidirectional with respect to the direction along which the magnet 10 is magnetized. FIGS. 13(c) through 13(f) show by an arrow directions of the electromagnetic force produced across the drive coil 12 as the direction of current passing through the drive coil 12 is changed, with respect to the direction along which the magnet 10 is magnetized. FIGS. 13(c) and 13(f), with indications of upward arrows, show the fact that the magnetic force produced across the drive coil 12 serves to demagnetize the magnet; while, in the structures shown in FIGS. 13(d) and 13(e), the magnetic force of the drive coil 12 serves to magnetize the magnet. Thus, if the drive coil 12 is connected to the electrical vibration system after the direction of the current flowing in the drive coil 12 is determined according to the direction along which the magnet is magnetized as shown in FIGS. 13(d) and 13(e), then this circuit is always able to effect drive in the magnetizing direction. In this specification, such arrangement is referred to as "pull system," and an arrangement as shown in FIGS. 13(c) and 13(f) for drive in the reverse direction is called "push system." While an arrangement where an alternating current power source is connected to the drive coil 12 is referred to as "push-pull system." The advantages of the pull system will be described below.

FIG. 13(b) shows magnetic characteristics necessary to obtain the same output in the push-pull system, pull system and push system. The electromagnetic force produced across the drive coil 12 must be constant for the period of one cycle of vibration if the output of the drive coil 12 is constant and the stroke of the vibration is also constant. In the three systems, the waveform of the current flowing in the drive coil 12 is nearly square when the compressor is driven by a unidirectional power source. The period for which the current flows in the drive coil 12, i.e., the duty cycle, is about 100% in the pushpull system and 50% in both the pull and push systems. To make the output of the drive coil 12 constant, the effective electromagnetic force F(rms) for the period of one cycle of vibration must be constant.

$$F(rms) = K \cdot B \cdot L \cdot N \cdot I \cdot D \qquad (3)$$

where

F (rms) the effective electromagnetic force for one cycle

B the density of magnetic flux (the intensity of magnetism)

L the mean length of the drive coil

N the number of turns of the drive coil

I the value of current flowing in the drive coil (drive coil current)

D the duty cycle

K a proportional constant

When B, L, N and K are constant in Eq. (3), the drive coil current I needed to attain the same effective electromagnetic force F(rms) for one cycle of vibration is twice larger in the push system, as well as in the pull system than in the push-pull system.

Referring to FIG. 13(b), the numerals 125, 126 and 127 denote demagnetization curves pertaining to the magnet 10 in the push-pull system, push system, and pull system respectively. The energy possessed by the magnet 10 increases in the order of curves 127, 125 and 126, and the size of the magnet 10 becomes large accordingly, provided that the kind of the magnet used is the same. The numeral 135 stands for a no-load performance curve of the magnetic circuit. When a demagnetization force $-H_1$ is given by the alternating current flowing in the drive coil in the push-pull system, the performance curce moves to 136 which is parallel with the performance curve 135. Similarly, when a magnetization force $+H_1$ is given, the performance curve goes to 137. While, when a demagnetization force $-H_2$ is given by the current flowing in the drive coil 12 in the push system, the performance curve is 138. When a magnetization force $+H_2$ is given by the drive coil 12 in the pull system, the performance curve is 139. In FIG. 13(b), the ordinate stands for the intensity of magnetism, B, and the abscissa for the intensity of magnetic field, H. In the push-pull system, when an alternating current flows in the drive coil 12, the magnetic circuit operates on the demagnetization curve of a minor hysteresis loop connecting between 128 and 130, centering the value of the intensity of magnetism $B_1$ located at the point 129 on the performance curve 135. The intensity of magnetism produced in this state is $B_2$ minimum and $B_3$ maximum. In a practical operation, an electromagnetic force is produced across the drive coil 12 at the points 128 and 130 where the direction of current changes, because, as described, the waveform of the current flowing in the drive coil 12 is nearly square. The intensities of magnetism produced in this state are $B_2$ and $B_3$, which change at every half-cycle in the push-pull system. In other words, the value of the current is nearly the same at every half-cycle, and hence the mean intensity of magnetism is $B_1$ in the push-pull system. This indicates that the size of the magnet must be so large as to possess energy greater than is available on the demagnetization curve 125 which crosses the performance curve 136 at the point 128 (where the magnetic intensity is $B_2$) when the demagnetization force produced by the current flowing in the drive coil is $-H_1$ in the push-pull system.

In the push system, in contrast to the push-pull system, the magnetic force produced by the current flowing in the drive coil 12 is always "demagnetizing" and its duty cycle is 50%. The value of the demagnetization force is $-H_2$ which is twice as large as that in the push-pull system and comes on the performance curve 138. The point 131 on the performance curve 138 indicates the intensity of magnetism $B_1$ necessary for the magnet. In this state, the magnetic circuit assumes a minor loop formed between the point 132 on the no-load performance curve 135 where the intensity of magnetism is $B_4$ and the point 131 on the performance curve 138 where the intensity of magnetism is $B_1$. Accordingly, the size of the magnet steel must be so large as to possess energy greater than is available on the demagnetization curve 126 which crosses the performance curve 138 at the point 131.

While, in the pull system, the magnetic force produced by the current flowing in the drive coil 12 is always "magnetizing" and its duty cycle is 50%. The magnetizing force is $+H_2$ which is twice as large as that in the push-pull system. The magnetic circuit operates in a minor loop formed between the point 133 on the performance curve 139 of $+H_2$ where the intensity of magnetism is $B_1$ and the point 134 on the no-load performance curve 135 where the intensity of magnetism is $B_5$. Therefore the magnet required is just as large as a size which meets at least the minimum intensity of magnetism $B_5$ on the minor loop. In other words, the magnet must have energy greater than on the demagnetization curve 127 which crosses the performance curve 135 at the point 134.

The features of the three systems will be summarized below in respect to the use of characteristics of the magnet.

The push system will first be described. On the demagnetization curve 126 which indicates the characteristic required for the magnet, the magnetic intensity at the initial magnetization is $B_6$ at the point 132' on the no-load performance curve 135. In the operating state, the intensity of magnetism is as small as $B_1$ at the point 131 because of the demagnetizing force $-H_2$ exerted by the drive coil 12. This shows that the difference in the magnetic force, $B_6-B_1$, serves for no purpose when the demagnetizing force $-H_2$ is applied (where only $B_1$ is used).

While, in the pull system, the magnetic intensity at the initial magnetization of the magnet is $B_5$ at the point 134 where the demagnetization curve intersects the no-load performance curve 135. But while a current is flowing through the drive coil 12 a magnetizing force having an intensity of $B_1$ is produced in the drive coil 12. In other words, the magnetic circuit operates at an intensity equivalent to the increment corresponding to the difference $B_1-B_5$. Thus the wasting component of magnetism is eliminated to allow the magnet only to meet the capacity of the intensity of magnetism below $B_1$. It is now apparent that the size of the magnet may be much smaller in the pull system than in the other systems. This feature is extremely useful to ease the design of a vibration type compressor, lower the production cost, and reduce the weight of the machine. Needless to mention, the design of a vibration type compressor differs largely according to which drive system is employed, the push-pull system, the push system, or the pull system.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structure by those skilled in the art to suit particular applications.

What is claimed is:

1. An electrical machine comprising a vibration type compressor including a mechanical vibration system having a drive coil with at least one spring resonant with the drive coil, an electrical vibration system having semiconductor switching elements of the type with a control electrode for switching-control according to variable factors of the electrical vibration system in relation to the vibration of the drive coil, and a control transformer of unsaturated core type for controlling the on and off of the semiconductor switching elements, the electrical vibration system being constructed and arranged to operate at the natural vibration cycle of the mechanical vibration system according to the movement of the mechanical vibration system, and at the same time, the electrical vibration system supplying the mechanical vibration system with electric power necessary to operate the mechanical vibration system.

2. An electrical machine as in claim 1 wherein the semiconductor switching element comprises at least one transistor, the mechanical vibration system includes a piston movable between a top dead point and a bottom dead point, the current flowing in the drive coil, which changes with change in the impedance dependent on the counter-electromotive force developed across the drive coil, is equaled to the output current of the transistor which performs switching control under the following condition:

$$I_C \geq h_{FE} I_B$$

where $I_C$ : the output collector current of a transistor used as the semiconductor element with a control electrode;

$I_B$ : the base current of the transistor;

$h_{FE}$ : the amplification factor of the transistor;

at the maximum output current available at the minimum counterelectromotive force across the drive coil at the top dead point and the bottom dead point of the piston of the mechanical vibration system.

3. An electrical machine as in claim 1 wherein the semiconductor switching element comprises at least one rectifier element with a control electrode, such as thyristor, the current flowing in the drive coil, which changes with change in the impedance dependent on the counter-electromotive force developed across the drive coil, is equaled to the output current of the semiconductor switching element which performs switching control under the following condition:

$$I_O \leq K I_M$$

where $I_M$ : the anode current of the rectifier element with a control electrode used as the semiconductor element having a control electrode;

$E_O$ : the compared voltage in a voltage comparator circuit;

$K$ : the conversion ratio of secondary voltage to primary current of a current transformer;

at the maximum output current available at the minimum counterelectromotive force across the drive coil.

4. An electrical machine as in claim 2 wherein at least one transistor is used as the semiconductor switching element with a control electrode included in switching element of the electrical vibration system, the electrical vibration system is coupled to the mechanical vibration system so that the change in the electrical characteristic of the drive coil, that is, the change in the impedance thereof, due to the vibration generated in the mechanical vibration system at its natural vibration cycle, causes the transistor to be on-off controlled through the control transformer of unsaturated core type, and even when the natural vibration cycle of the mechanical vibration system varies due to variation in the power source voltage and/or variation in the external condition, the change in the impedance across the drive coil is derived substantially proportionally to the change in the natural vibration cycle of the mechanical vibration system by utilizing the linear characteristic of the control transformer of unsaturated core type, and thus the switching of the transistor is controlled according to the perpetually changing natural vibration cycle of the mechanical vibration system.

5. An electric machine as in claim 3 wherein at least one rectifier element with a control electrode is used as the semiconductor switching element with a control electrode included in the electrical vibration system, a current transformer and a trigger circuit are provided, the current transformer being serial with the drive coil, and the trigger circuit being capable of generating a pulse according to the quantity of electrical change developed in the current transformer, so that the change in the electrical characteristic of the drive coil, that is, the change in the impedance thereof, due to the vibration generated in the mechanical vibration system at its natural vibration cycle, causes the rectifier element with a control electrode to be on-off controlled through the control transformer of unsaturated core type, and even when the natural vibration cycle of the mechanical vibration system varies due to variation in the power source voltage and/or variation in the external condition, the change in the impedance across the drive coil is derived substantially proportionally to the change in the natural vibration cycle of the mechanical vibration system by utilizing the linear characteristic of the control transformer of unsaturated core type, and thus the rectifier element with a control electrode is on-off controlled by the pulse of the trigger circuit.

6. An electrical machine as in claim 1 wherein the vibration type compressor includes an electrical circuit driven either from a unidirectional power source or from an alternating current power source, and a means arranged to disconnect the control circuit of the compressor, which is normally connected to the unidirectional power circuit, from the control circuit comprising the switching elements when the alternating current power source is connected thereto.

7. An electrical machine as in claim 1 wherein the control transformer of unsaturated core type for controlling the switching elements of the electrical vibration system includes an AC power input winding.

8. An electrical machine as in claim 1 wherein an output transformer is connected between the mechanical vibration system of the compressor and the output terminal of a control circuit comprising the switching elements, and the output voltage of the output transformer is supplied to the terminals of the drive coil and, at the same time, the current changingly flowing in the drive coil is transferred through the output transformer to the control circuit which comprises switching elements.

9. An electrical machine as in claim 2 wherein the electrical vibration system is operated in such a manner that when transistors are used as the semiconductor switching elements for the electrical vibration system of the compressor, the transistors perform switching at an oscillating frequency which depends on the characteristic in a saturated range beyond the linear characteristic of the control transformer of unsaturated core type when the drive coil is disconnected from the electrical vibration system, or the transistors operate always at the natural vibration cycle of the mechanical vibration system of the compressor when the electrical vibration system is coupled to the drive coil of the compressor and supplied with power from the unidirectional power source.

10. An electrical machine as in claim 3 wherein the electrical vibration system is operated in such manner that when rectifier elements of the type with a control electrode are used as the switching elements for the electrical vibration system of the compressor, the rectifier elements perform switching at an oscillating frequency which depends on the characteristic in a saturated range beyond the linear characteristic of the control transformer of unsaturated core type or the electrical vibration system assumes a non-oscillating state, and the rectifier elements operate always at the natural vibration cycle of the mechanical vibration system of the vibration type compressor when the electrical vibration system is coupled to the drive coil of the compressor and supplied with power from the unidirectional power source.

11. An electrical machine as in claim 4 wherein a capacitor, a resistor, and a third winding of the control transformer are connected across between the positive and negative terminals of the unidirectional power source whereby a transient current is provided to compensate for the starting current of the vibration type compressor.

12. An electrical machine as in claim 4 comprising a bridge including four transistors, two opposite ones serially operable independent of the other two opposite ones, the two opposite transistors having their emitter-collector circuits connected to the drive coil to allow a current to flow in the drive coil through the terminal of the compressor, and the other two opposite transistors having their emitter-collector circuits connected to a unidirectional power source to allow a current to be supplied to the drive coil, and wherein the primary winding of the control transformer using unsaturated core type is connected in parallel to the drive coil for detecting the current flowing through the drive coil, and the emitter-base circuits of the individual opposite transistors are connected to the secondary winding of the control transformer using unsaturated core type so that the emitter-base circuits of the transistors are controlled according to the on-off of the current flowing through the drive coil.

13. An electrical machine as in claim 4 including two transistors the collectors of which are connected across the control transformer using unsaturated core type in parallel with the drive coil of the vibration type compressor, the center tap of the control transformer using unsaturated core type and the emitters of the two transistors being connected to a unidirectional power source, and the bases of the transistors being connected across a second winding of the control transformer using unsaturated core type so that the transistors are controlled according to on and off of the current in the drive coil, a voltage about twice that of the unidirectional power source is applied to the drive coil.

14. An electrical machine as in claim 5 wherein the semiconductor switching elements comprise four rectifier elements with a control electrode such as thyristor, two of the rectifier elements with a control electrode having their anodes connected to the positive terminal of a unidirectional power source and the other two rectifier elements with a control electrode having their cathodes connected to the negative terminal of the unidirectional power source, the cathodes of the two rectifier elements with a control electrode being connected to one terminal of the windings of two commutation reactors, respectively, each having a center tap, the anodes of the latter pair of rectifier elements with a control electrode being connected to the other terminals of the two commutation reactors, a commutation capacitor connected between the power source and the center tap of each of the reactors, the primary winding of a current transformer in series with the drive coil being connected between the two center taps of the commutation reactors, the unidirectional power input primary winding of the control transformer using unsaturated core type being connected in parallel to the primary winding of the current transformer and drive coil connected series each other thereby forming a bridge circuit comprising the rectifier elements with a control electrode, a trigger circuit for generating trigger pulses to turn on and off alternately the two pairs of opposite rectifier elements with a control electrode, and the current transformer being selectively connected to the input terminals of the trigger circuit so that the timing of the trigger pulse is selectively taken out of the secondary winding of the current transformer.

15. An electrical machine as in claim 5 wherein the semiconductor switching elements comprise two rectifier elements with a control electrode such as thyristor, the two rectifier elements with a control electrode having their cathodes commonly connected to one terminal of a commutation reactor, the other terminal of the commutation reactor being connected to the negative terminal of a unidirectional power source, the anodes of the two rectifier elements with a control electrode being connected to each other through a commutation capacitor, the commutation capacitor being connected in parallel to the unidirectional power input primary winding of the control transformer using unsaturated core type, a tap installed at nearly the center of the primary winding of the control transformer using unsaturated core type, the tap being connected to the positive terminal of the unidirectional power source, the drive coil being connected to the anodes of the rectifier elements with a control electrode through the primary winding of a current transformer, a trigger circuits for generating trigger pulses to turn on and off alternatively the two rectifier elements with a control electrode, and the current transformer being connected to the input terminal of the trigger circuits whereby the timing of the trigger pulse is selectively determined on the secondary winding of the current transformer.

16. An electrical machine as defined in claim 4 wherein the switching elements comprise one transistor element, a series connection between a unidirectional power source, the primary winding of the control transformer using unsaturated core type, a limiting resistor and the emitter-collector circuit of the transistor element, the drive coil of the compressor being connected in parallel to the winding of the control transformer using unsaturated core type and the limiting resistor so that the collector current of the transistor serves directly as the current supplied to the drive coil, the secondary winding of the control transformer using unsaturated core type being connected to the base of the transistor so that the current flowing through the drive coil is controlled according to the on and off of the transistor, and a starting transient current compensating resistor connected between the base and the collector of the transistor.

17. An electrical machine as in claim 4 wherein four transistors are used as the switching elements connected in a bridge form, of which a pair of serial transistors make up each bridge arm, and the two pairs of them are connected in parallel to the two ends of the drive coil, one pair of serial transistors are of the same structure type such as PNP type (or NPN type) and the other pair of serial transistors are also of the same structure type such as NPN type (or PNP type), the two pair of serial transistors whose are connected in parallel to the two ends of the unidirectional power source are different structure type from each other (such as PNP and NPN type), and the switching control output winding of the control transformer of unsaturated core type is connected between the emitter and the base of each transistor.

18. An electrical machine as in claim 17 wherein four transistors are used as the semiconductor switching elements, connected in a bridge form, of which one PNP type transistor and one NPN type transistor make up a pair, each pair of transistors have their emitter in common, as well as their bases in common, the two pairs of common emitters are connected respectively to the two ends of the drive coil, the collectors of the two PNP type transistors are connected to the negative terminal of the unidirectional power source, and the collectors of the two NPN type transistors are connected to the positive terminal thereof, the control output winding of the control transformer of unsaturated core type is common to each pair of PNP and NPN type transistors and connected between the base and the emitter of each transistor.

19. An electrical machine as in claim 17 wherein four transistors are used as the semiconductor switching elements, connected in a bridge form, of which one PNP type transistor and one NPN type transistor make up a pair, each pair of transistors have their collectors in common, the two pairs of common collectors are connected respectively to the two ends of the drive coil, the emitters of the two PNP type transistors are connected to the negative terminal of the unidirectional power source, and the emitters of the two NPN type transistors are connected to the positive terminal thereof, the control output winding of the control transformer of unsaturated core type is common to each pair of transistors whose structure types are the same and is connected between the base and the emitter of each transistor, and a diode is inversely connected between the emitter and the base of each transistor, thus forming a bridge-like feedback circuit mechanism together with the base circuit.

20. An electrical machine as in claim 5 wherein the semiconductor switching elements comprise at least one rectifier element with a control electrode, such as thyristor, which has its anode connected to the positive terminal of a unidirectional power source and its cathode connected to one terminal of the drive coil by way of a control transformer of unsaturated core type operated as a commutation reactor, the negative terminal of the unidirectional power source being connected to the other terminal of the drive coil, a current transformer for detecting the value of the current flowing in the drive coil connected in series between one terminal of the unidirectional power source and one terminal of the drive coil, and a trigger circuit and a turn-off circuit having a thyristor capable of causing the rectifier element to repeat turn-on and turn-off, and such switching operation being selectively performed at both extreme amplitude positions of the drive coil.

21. An electrical machine as in claim 5 wherein a trigger circuit is provided, which receives a current input signal from the secondary winding of a current transformer connected in series between a unidirectional power source and one terminal of the drive coil, a resistor for converting the current input signal into a voltage signal is provided in the trigger circuit in parallel with the secondary winding of the current transformer, a pair of voltage comparator circuits operated alternately due to compare with predetermined value and the value of the voltage signals produced across the resistor is provided in the trigger circuit, the resistor being connected between the two input terminals of the individual voltage comparator circuits, and the voltage comparator circuits generate trigger pulses alternately and selectively according to the direction and value of the current flowing in the drive coil.

22. An electrical machine as in claim 21 comprising a trigger circuit wherein a pulse shaping circuit is provided, which shapes the output signal of a set of voltage comparator circuits driven according to the value of the current input signal and supplies the shaped pulses to a pulse amplifier circuit, and this circuits capable of amplifying the pulse signal from the pulse shaping circuit and thus generating a pulse output are provided respectively for a set of the voltage comparator circuits.

23. An electrical machine as in claim 4 wherein at least two transistors are used as the semiconductor switching elements, the emitters of a pair of the transistors being connected commonly to one terminal of a unidirectional power source, the collectors of the pair of transistors being connected to the both terminals of said drive coil respectively, diodes connected between the bases and the emitters of the individual transistors so that the currents of the transistors are inverted from each other, and the base-emitter circuits of the pair of transistors and the diodes constituting a bridge rectifier circuit.

24. An electrical machine as in claim 5 wherein at least one set of initial oscillation compensating circuits is provided, which comprises a series circuit of at least one resistor and one capacitor, thyristors are used as the semiconductor switching elements, the series circuit is connected between the positive terminal of a unidirectional power source and the gate of the thyristor, and thus the initial oscillation is compensated.

25. An electrical machine as in claim 20 wherein a resistor for converting the current signal from the secondary winding of a current transformer connected in series between the unidirectional power source and one terminal of the drive coil, into a voltage signal is connected in parallel with the secondary winding thereof, a turn-off circuit is constituted of a series circuit comprising a comparator circuit due to compare with predetermined value and the value of the voltage signals produced across the resistor and thereby generating a pulse voltage, a shaping circuit for shaping the waveform of the pulse voltage from the comparator circuit, and an amplifier circuit for amplifying the output signal of the shaping circuit, while, a turn-on circuit is constituted of a series circuit comprising the shaping circuit, the amplifier circuit and a zero-cross circuit for generating a pulse signal at the moment the terminal voltage of the drive coil changes its polarity, and a trigger circuit is constituted of a pair of the turn-off and turn-on circuits.

26. An electrical machine as in claim 20 comprising a primary winding operated as a commutation reactor when a unidirectional power source is connected to the control circuit, and a relay operated so that when an alternating power source is connected to the circuit an alternating voltage is induced across the primary winding of the control transformer using unsaturated core type having an alternating power input winding wound on the core on which the primary winding is wound thus supplying alternating power to the drive coil.

27. An electrical machine as in claim 1 wherein the drive coil is inserted in the magnetic field produced in a magnetic circuit comprising a york, a permanent magnet, and a pole piece, which constitute the magnetic circuit of the vibration type compressor, the polarity of a unidirectional power source is selectively connected to the electrical vibration system so that the electromagnetic force produced by the unidirectional interrupted drive current flowing in the drive coil is exerted always in the direction along which the permanent magnet is magnetized, and thus the permanent magnet operates always with a magnetic intensity above a value corresponding to the no-load performance point when the permanent magnet undergoes initial magnetization.

* * * * *